United States Patent
Hwang et al.

(10) Patent No.: US 12,458,300 B2
(45) Date of Patent: Nov. 4, 2025

(54) METHOD OF PROVIDING HEALTH INFORMATION USING ELECTRONIC DEVICE AND THE ELECTRONIC DEVICE

(71) Applicant: SAMSUNG ELECTRONICS CO., LTD., Suwon-si (KR)

(72) Inventors: Jeong Eun Hwang, Suwon-si (KR); Jin Young Park, Suwon-si (KR); Myoung Hoon Jung, Suwon-si (KR); Yoon Jae Kim, Suwon-si (KR); Hyun Seok Moon, Suwon-si (KR); Kun Sun Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 18/141,788

(22) Filed: May 1, 2023

(65) Prior Publication Data
US 2024/0203577 A1    Jun. 20, 2024

(30) Foreign Application Priority Data
Dec. 20, 2022   (KR) .................... 10-2022-0179594

(51) Int. Cl.
*A61B 5/00* (2006.01)
*G06F 3/01* (2006.01)
(Continued)

(52) U.S. Cl.
CPC ............. *A61B 5/744* (2013.01); *A61B 5/743* (2013.01); *A61B 5/7435* (2013.01); *G06F 3/017* (2013.01);
(Continued)

(58) Field of Classification Search
CPC ......... A16B 5/744; A16B 5/681; A61B 5/743; A61B 5/7435; G16H 50/30; G16H 40/63; G06F 3/017; G06F 3/04817; G06F 3/0487

See application file for complete search history.

(56) References Cited

U.S. PATENT DOCUMENTS

| 7,365,839 B2 | 4/2008 | Ferguson et al. |
| 8,260,402 B2 | 9/2012 | Ermakov et al. |

(Continued)

FOREIGN PATENT DOCUMENTS

| JP | 2020-184121 A | 11/2020 |
| JP | 2021-105997 A | 7/2021 |

(Continued)

OTHER PUBLICATIONS

Ersotelos et al., "A user interface design for a patient oriented digital patient," 13th IEEE International Conference on BioInformatics and BioEngineering; Date of Conference: Nov. 10-13, 2013 DOI: 10.1109/BIBE.2013.6701588; Publisher: IEEE. (Year: 2013).*

(Continued)

*Primary Examiner* — Jonathon A. Szumny
(74) *Attorney, Agent, or Firm* — Sughrue Mion, PLLC

(57) ABSTRACT

Provided is a method of providing health information using an electronic device with a display devices. One or more processors may be configured to display, based on a request from a user, a home screen of a user interface through a display device, assess a health status of a user based on receiving data related to one or more health indices, display a virtual avatar that responds to a health status of the user on the home screen, determine a new visualization method of the virtual avatar, and modify the representation of the virtual avatar according to the determined new visualization method.

14 Claims, 58 Drawing Sheets

(51) Int. Cl.
*G06F 3/04817* (2022.01)
*G06F 3/0487* (2013.01)
*G16H 40/63* (2018.01)
*G16H 50/30* (2018.01)

(52) U.S. Cl.
CPC ........ *G06F 3/04817* (2013.01); *G06F 3/0487* (2013.01); *G16H 40/63* (2018.01); *G16H 50/30* (2018.01); *A61B 5/681* (2013.01)

(56) References Cited

U.S. PATENT DOCUMENTS

| | | | |
|---|---|---|---|
| 8,629,986 B2 | 1/2014 | Hillmer et al. | |
| 8,928,671 B2* | 1/2015 | Adler | G16H 50/50 |
| | | | 345/475 |
| 9,198,622 B2* | 12/2015 | Kaleal, III | A61B 5/744 |
| 9,348,141 B2 | 5/2016 | Bar-Zeev et al. | |
| 9,613,445 B2* | 4/2017 | Gilger | G16Z 99/00 |
| 10,185,805 B2* | 1/2019 | Gulaka | G06F 18/41 |
| 10,252,058 B1* | 4/2019 | Fuerst | A61N 1/36014 |
| 10,416,079 B2 | 9/2019 | Magnussen et al. | |
| 10,504,616 B2 | 12/2019 | Kawai et al. | |
| 10,504,617 B2 | 12/2019 | Hattori et al. | |
| 10,777,305 B2 | 9/2020 | Kawai et al. | |
| 10,847,255 B2 | 11/2020 | Hattori | |
| 10,956,031 B1* | 3/2021 | Teague | G06F 3/04886 |
| 10,987,042 B2 | 4/2021 | Kawai et al. | |
| 11,026,612 B2 | 6/2021 | Hattori et al. | |
| 11,571,153 B2 | 2/2023 | Hattori et al. | |
| 11,721,440 B1* | 8/2023 | Shan | G16H 40/67 |
| | | | 705/2 |
| 2004/0002634 A1* | 1/2004 | Nihtila | A61B 5/0002 |
| | | | 600/300 |
| 2009/0309891 A1* | 12/2009 | Karkanias | A63F 13/65 |
| | | | 345/581 |
| 2013/0002435 A1* | 1/2013 | Utter, II | A61B 5/0022 |
| | | | 340/575 |
| 2014/0125480 A1* | 5/2014 | Utter, II | G16H 50/30 |
| | | | 340/539.12 |
| 2016/0125635 A1* | 5/2016 | Nam | A63F 13/58 |
| | | | 715/764 |
| 2016/0224737 A1* | 8/2016 | Okabe | G16H 40/63 |
| 2016/0226945 A1* | 8/2016 | Granqvist | A61B 5/7435 |
| 2016/0317074 A1 | 11/2016 | Kawai et al. | |
| 2016/0328524 A1 | 11/2016 | Kawai et al. | |
| 2016/0328533 A1 | 11/2016 | Kawai et al. | |
| 2016/0328534 A1 | 11/2016 | Kawai et al. | |
| 2016/0335402 A1 | 11/2016 | Kawai et al. | |
| 2017/0011210 A1* | 1/2017 | Cheong | A61B 5/681 |
| 2017/0080346 A1* | 3/2017 | Abbas | A63F 13/79 |
| 2017/0221370 A1* | 8/2017 | Chander | G09B 19/0092 |
| 2018/0103916 A1* | 4/2018 | Tscholl | G16H 40/63 |
| 2018/0122517 A1* | 5/2018 | Bessette | G16H 20/30 |
| 2020/0029873 A1 | 1/2020 | Park et al. | |
| 2020/0090794 A1* | 3/2020 | Jung | G16H 10/60 |
| 2020/0196935 A1 | 6/2020 | Eom et al. | |
| 2020/0293174 A1* | 9/2020 | Diaz | A61B 34/25 |
| 2020/0297267 A1 | 9/2020 | Wei | |
| 2020/0352478 A1 | 11/2020 | Park | |
| 2022/0047226 A1* | 2/2022 | Nojima | G16H 50/70 |
| 2022/0051399 A1 | 2/2022 | Song | |
| 2022/0218244 A1* | 7/2022 | Kiani | A61B 5/746 |
| 2022/0384027 A1* | 12/2022 | Kaleal, III | A61B 5/11 |
| 2023/0404489 A1* | 12/2023 | Kaczmarek | A61B 5/7435 |

FOREIGN PATENT DOCUMENTS

| | | | | |
|---|---|---|---|---|
| JP | 2021-179856 A | | 11/2021 | |
| JP | 2022-17322 A | | 1/2022 | |
| KR | 10-2016-0050573 A | | 5/2016 | |
| KR | 10-2020-0002247 A | | 1/2020 | |
| KR | 10-2021-0019905 A | | 2/2021 | |
| WO | WO-2007016056 A2 * | | 2/2007 | .......... A61B 5/0002 |
| WO | 2020/055325 A1 | | 3/2020 | |
| WO | WO-2020207317 A1 * | | 10/2020 | |

OTHER PUBLICATIONS

Kim et al., "Interfacing sensors and virtual world health avatar application," The 5th International Conference on New Trends in Information Science and Service Science; Date of Conference: Oct. 24-26, 2011 Publisher: IEEE. (Year: 2011).*

Cha, "The Effect of UI Usability of Mobile Healthcare Applications on Technostress and Continuous Use Intention: Focusing on Elderly Users," Journal of Digital Convergence, vol. 19, No. 5, pp. 295-305, 2021.

MacKinlay, "Automating the Design of Graphical Presentations of Relational Information," ACM Transactions on Graphics, vol. 5, No. 2, pp. 110-141, Apr. 1986.

Zhang et al., "Generating Character Descriptions for Automatic Summarization of Fiction," The Thirty-Third AAAI Conference on Artificial Intelligence (AAAI-19), pp. 7476-7483, 2019.

* cited by examiner

FIG. 8B

| Data ID | 1st Data Type | Value | Criteria | Diagnosis | 3rd Data Type | Domain |
|---|---|---|---|---|---|---|
| Age | Quantitative | 70 | >70 | Elderly | Ordinal | - |
| sex | Nominal | F | Female | Female | Nominal | - |
| Sensor1 | Quantitative | 50 | % of body Fat | Obesity | Quantitative | D |
| Sensor2 | Quantitative | 160 | SBP>140... | Hypertension | Ordinal | A |
| Sensor3 | Quantitative | 160 | HR>150 | High HR | Ordinal | A |
| Sensor4 | Quantitative | 50 | No criteria → Clustering | Cluster A | Nominal | C |

DT1 {columns: Data ID, 1st Data Type, Value, Criteria}
DT2 {columns: Diagnosis, 3rd Data Type, Domain}

FIG. 8C

| Domain | Health index | Assessment | Assessment criteria | Symbol (Symbol line) | Change index 1 (Avatar shape) | Change index 2 (Character's action) |
|---|---|---|---|---|---|---|
| Cardiovascular index | Heart rate (Irregular pulse diagnosed) HR | Slow heartbeat | HR<50 | Arr. | Blue lightning | Slowing down |
| | | Rapid heartbeat | HR>150 | Arr. | Red lightning | Speeding up |
| | | Atrial fibrillation | Irregular heartbeat | Fib. | Yellow lightning | Irregular movement |
| | Blood pressure BP | Hypotension | SBP<100mmHg or DBP<60mmHg | HypoT | Blue face | Slowing down and gradually sitting down |
| | | Hypertension | SBP>140mmHg or DBP>90mmHg | HyperT | Red face | face swelling |

FIG. 8D

| Domain | Health index | Assessment | Assessment criteria | Symbol (Symbol line) | Change index 1 (Avatar shape) | Change index 2 (Character's action) |
|---|---|---|---|---|---|---|
| Vitality index | Exercise (Number of steps and other activities) | Lack of exercise | Below target amount (Below average) | lowΛ | Thinner arms/legs | Moving arms/legs (Reminder for exercise) |
|  | | Muscle mass | 100% or more | HighΛ | Biceps thickness in proportional to skeletal muscle mass | Bulging arms/legs (Glossy) |
|  | Stress | Stress | High stress level | Stress | Raised eyebrows | Lower background moving up |

FIG. 8E

| Domain | Health index | Assessment | Assessment criteria | Symbol (Symbol line) | Change index 1 (Avatar shape) | Change index 2 (Character's action) |
|---|---|---|---|---|---|---|
| Sleep-related index | Sleep time, Sleep stage, Sleep quality | Sleep time notification | Average sleep duration, at set sleep time | Time | Created zzz, sleepy eyelids | Creating blanket/hat, moving toward watch screen |
| | | During sleep | No movement, upon detecting sleep (Sleep recording) | Record | Dark mode screen | In lying position |
| | | Lack of sleep | 5 hrs or less, or below average sleep duration | lowS | Formed dark circles | Slowing down, rubbing eye |

FIG. 8F

| Domain | Health index | Assessment | Assessment criteria | Symbol (Symbol line) | Change index 1 (Avatar shape) | Change index 2 (Character's action) |
|---|---|---|---|---|---|---|
| Nutrition/hydration-related index | Antioxidant index (Fvscore), Body water, Body fat (bia) indices, etc. | Lack of vegetable/fruit intake | FVscore <50 | lowFV | White torso, Zero leaves on head | Waving fallen leaf |
| | | Sufficient vegetable/fruit intake | Fvscore >150 | GoodFV | Torso: orange color, the number of leaves on head in proportion to value (two for more than 200, one for 150) | Shaking leaves on head to show off |
| | | Lack of body water | Less than 50% for men, Less than 45% for women | Water | Face: brown color, water cup | Background cracking |
| | | Excessive body water | More than 65% for men, More than 60% for women | HWater | Water dropping from avatar's body and pooling on the ground | Character shape becoming limp |
| | | Excessive body fat (Normal: male:15-20%, female:20-25%) | >25% or more (or exceeding target value) | Fat | Character's waist increasing by 1.25 times | Slowing down |
| | | | >40% or more (or 1.5 times of target value) | Fat | Character's waist increasing by 1.4 times | Sitting down |

METHOD OF PROVIDING HEALTH INFORMATION USING ELECTRONIC DEVICE AND THE ELECTRONIC DEVICE

CROSS-REFERENCE TO RELATED APPLICATION(S)

This application claims the benefit under 35 USC § 119(a) of Korean Patent Application No. 10-2022-0179594, filed on Dec. 20, 2022, in the Korean Intellectual Property Office, the disclosure of which is incorporated herein by reference in its entirety.

BACKGROUND

1. Field

Apparatuses and methods consistent with example embodiments relate to a method of providing health information using an electronic device, and the electronic device.

2. Description of Related Art

With an aging population, increased medical costs, and a shortage of medical personnel for specialized medical services, research has been actively conducted on information technology (IT)-medical convergence technologies, in which IT technology and medical technology are combined. Particularly, monitoring of a health condition of a human body may not be limited to places such as hospitals, but is expanded by mobile healthcare fields that may monitor a user's health condition anywhere (e.g., at home or office on in transit from one place to another place) and anytime in daily life.

SUMMARY

According to an aspect of the disclosure, a method of providing health information, using an electronic device with a display device and one or more processors, includes: displaying, based on a request from a user, a home screen of a user interface through the display device; assessing a health status of a user based on receiving data related to one or more health indices; displaying a virtual avatar that responds to the health status of the user on the home screen; determining a visualization method for a health index prompting notification to the user based on the assessed health status; and modifying an appearance of the virtual avatar based on the determined visualization method.

The method may further include receiving the data from at least one of a sensor included in the electronic device, an application installed on the electronic device, or another electronic device.

The assessing of the health status may include: assessing a health status for each item of the received data based on assessment criteria or a classification database (DB) defined for each health index; and classifying a data type and a domain of each item of the received data based on the health status assessment.

The determining of the visualization method may include determining one or more marks belonging to the virtual avatar and one or more channels for visualizing the one or more marks based on at least one of the data type or the domain.

The visualization method may include at least one of changing a color of a first mark belonging to the virtual avatar, changing at least one of a size and shape of a second mark, changing at least one of a color and a number of third marks, or changing a size or movement of a fourth mark.

The modifying of the appearance of the virtual avatar may include, based on the visualization method for the one or more health indices being determined, determining the one or more health indices based on a visualization priority, and modifying the appearance of the virtual avatar based on the visualization method for the determined one or more health indices.

The modifying of the appearance of the virtual avatar may include determining the visualization priority based on at least one of health risk degree, user's preference, or possibility of improvement.

The method may further include displaying a symbol for each domain on the home screen; and modifying, based on a domain of the received data being classified, an appearance of a symbol of the classified domain.

The domain may include at least one of a cardiovascular index, a vitality index, a sleep-related index, or a nutrition/hydration-related index.

The method may further include displaying information related to the health status assessment at a portion near the symbol whose appearance is modified, at a same time of modifying the appearance of the symbol.

The method may further include identifying a gesture performed on the user interface and performing a corresponding operation based on the identified gesture.

The performing of the corresponding operation may include displaying at least one of health status assessment or health guide through a movement or speech bubble of the virtual avatar in response to a user's click on the virtual avatar.

The performing of the corresponding operation may include at least one of displaying a detailed specification related to the health status assessment on the home screen in a superimposed fashion or switching the home screen to a detailed specification screen in response to a user's click on the symbol.

The performing of the corresponding operation may include performing at least one of moving a position of the virtual avatar or the symbol, reducing the virtual avatar or the symbol in response to a user's action of dragging or doubling clicking the virtual avatar or the symbol, enlarging the virtual avatar or the symbol in response to a user's action of dragging or doubling clicking the virtual avatar or the symbol, and widening or narrowing a space between two fingers in contact with the virtual avatar or the symbol.

The user interface may include one or more screen switching areas, and the performing of the corresponding operation further may include switching a current screen to a different screen based on the user performing at least one of clicking, double clicking, and dragging on the one or more screen switching areas.

The different screen may include at least one of an application screen, a setting screen, a help screen, a detailed specification screen associated with health status assessment, a statistical summary screen, a health guide screen, a reward point screen, or a decoration screen for the virtual avatar or the symbol.

The screen switching areas may include a visual object for recognizing a different screen that corresponds to each of the screen switching areas.

The assessing of the health status may include: determining a degree of achievement of a goal set by the user based on the health status assessment; and providing reward points based on the degree of achievement of the goal.

According to an aspect of the disclosure, an electronic device includes: a display device; one or more processors; and a memory storing one or more programs configured to be executed by the one or more processors to: display, based on a request from a user, a home screen of a user interface through the display device; assess a health status of a user based on receiving data related to one or more health indices; display a virtual avatar that responds to the health status of the user on the home screen; determine a visualization method for a health index prompting notification to the user based on the assessed health status; and modify an appearance of the virtual avatar based on the determined visualization method.

According to an aspect of the disclosure, a non-transitory computer-readable storage medium storing one or more programs configured to be executed to perform a method including: displaying, based on a request from a user, a home screen of a user interface through the display device; assessing a health status of a user based on receiving data related to one or more health indices; displaying a virtual avatar that responds to the health status of the user on the home screen; determining a visualization method for a health index prompting notification to the user based on the assessed health status; and modifying an appearance of the virtual avatar based on the determined visualization method.

Other features and aspects will be apparent from the following detailed description, the drawings, and the claims.

BRIEF DESCRIPTION OF THE DRAWINGS

The above and/or other aspects will be more apparent by describing certain example embodiments, with reference to the accompanying drawings, in which:

FIG. 8B shows an example of a data table generated through data conversion in an operation of assessing a health status, according to an embodiment;

FIGS. 8C to 8F are tables which define various visualization methods of a virtual avatar and symbols, according to one or more embodiments;

DETAILED DESCRIPTION

Figure 1:
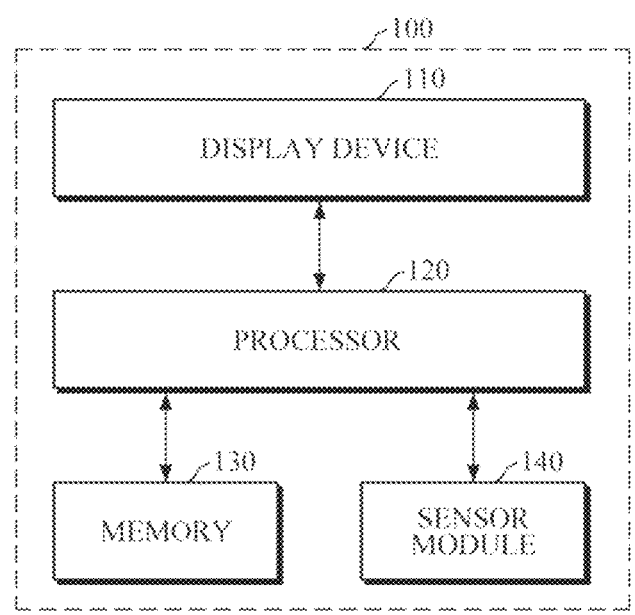
FIG. 1 is a block diagram illustrating an electronic device according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram illustrating an electronic device according to an embodiment.

Referring to FIG. 1, an electronic device 100 according to an embodiment includes a display device 110, a processor 120, a memory 130, and a sensor module 140.

The display device 110 may visually display a variety of data processed in one or more processors 120. The display device 110 may include a display, a hologram device, or a projector, and a control circuit for controlling the device. The display device 110 may include touch circuitry set to sense touch and/or sensor circuitry (a pressure sensor, etc.) set to measure the intensity of force generated by the touch.

One or more processors 120 may be provided. The processor 120 may control one or a plurality of other components (hardware and/or software components, and the like) connected to the processor 120 by executing a program stored in the memory 130, and may perform data processing or operation. The program may include one or more instructions to perform various data processing or operations. The processor 120 may store results of data processing or operation in the memory 130.

For example, a user may request health information by taking a predetermined action using the electronic device 100. The gesture may include inputting voice command, such as "execute a health application," or clicking a health application displayed on the display device 110. The processor 120 may detect the user's gesture, and may perform an operation for providing health information by executing a corresponding health application program stored in the memory 130 in response to the user's gesture.

The processor 120 may collect pieces of data for various health indices from the sensor module 140, an application and/or another electronic device. The health indices may include user information, such as age, height, weight, sex, disease information, and the like, blood pressure, skin condition, an antioxidant value, blood glucose, cholesterol, triglyceride, calories, heart rate, body temperature, exercise amount, the number of steps, a moving distance, stress, sleep information (sleep time, sleep stage, and sleep quality), body water, body fat, photoplethysmogram (PPG), bioelectrical impedance analysis (BIA), electrocardiogramalectromyography (EMG), impedance plethysmogram (IPG), pressure wave, video plethysmogram (VPG), weather, female health monitor, an elevation, a pace, a speed, a force/pressure, etc.

The processor 120 may comprehensively analyze and assess the user's health status based on the collected data, and may visually display health items that may require notification to the user on the display device 110 using a virtual avatar (character) and/or symbols (figures). In this way, the health status is visually provided using a virtual avatar and/or symbols, thereby preventing exposure of detailed health information so that security issues regarding personal information may be minimized. In addition, the user may check his/her health status and/or health guide through a virtual avatar in an intuitive and comprehensive form without having to manually find and check applications related to individual indices to check health information. The health items may be partly the same as the health indices, or may be defined as a single health item by combining a plurality of health indices. For example, major categories may include a cardiovascular index (heart rate, blood pressure, electrocardiogram, etc.) domain, a vitality index (skin condition, exercise, stress, etc.) domain, a sleep-related index (sleep time, sleep stage, sleep status, etc.) domain, a nutrition/hydration-related index (blood glucose, antioxidant, body water, body fat, muscle mass, etc.) domain, and the like.

The memory 130 may store a variety of data used by the elements (e.g., processor 120, sensor module 140, and the like) of the electronic device 100. The data may include, for example, software (e.g., a program and the like), sets of instructions, and input data and/or output data for instructions related thereto. The program may be stored as software in the memory 130, and may include an operating system, middleware and/or applications (applications related to clock, music, schedule, contact, message, social media, drawing, presentation, word processing, spreadsheet, game, phone, video conferencing, e-mail, web browsing, photography, camera, video, health management, etc.).

The memory 130 may optionally include one or more computer-readable storage media. A computer-readable storage medium may store a health application program that performs various health information providing functions to be described below. The memory 130 may optionally include a high-speed random access memory, one or more magnetic disk storage devices, a flash memory device, a non-volatile memory such as a non-volatile solid state memory device.

The sensor module 140 may detect an operational state (power, temperature, or the like) of the electronic device 100, or an external environmental state (user state or the like), and generate an electrical signal and/or data value corresponding to the detected state. The sensor module 140 may include a global positioning system (GPS), a gesture sensor, a gyro sensor, a barometric pressure sensor, a magnetic sensor, an acceleration sensor, a grip sensor, a proximity sensor, a color sensor, an infrared (IR) sensor, a compass sensor, a pedometer sensor, and an ultraviolet ray sensor, a three-dimensional (3D) touch sensor, a biometric sensor, a body temperature sensor, a temperature sensor, a humidity sensor, and/or an illuminance sensor.

The biometric sensor may be a PPG sensor, a BIA sensor, an ECG sensor, an EMG sensor, an IPG sensor, a pressure wave sensor, a VPG sensor, a heart rate sensor, a blood glucose sensor, a skin colorimeter, or an antioxidant sensor. The biometric sensor may include a light source configured to emit light to a bio-tissue of the user and a detector configured to detect light that is returned after being scattered, reflected, or transmitted through the bio-tissue. The light source may include one or a plurality of light source arrays to emit light of a single wavelength or light of a plurality of different wavelengths (e.g., green, red, blue, and infrared wavelengths). The detector may include a photodiode, a photo transistor (PTr), an image sensor (e.g., a complementary metal-oxide semiconductor (CMOS) image sensor), or the like, and may be formed in a single form or an array form. The wavelength of the light source may be comprised of various wavelength bands depending on the type of biometric information, and may optionally include a signal processor configured to acquire biometric information, such as blood pressure, blood glucose, antioxidant, and the like, by using a light signal detected by the detector. For example, the wavelength of the light source may be configured to emit a wavelength band of 400 nm to 600 nm. The amount of light detected using the light source and the detector and the amount of light measured during calibration may be used to calculate absorbance based on the Beer-Lambert law, and an antioxidant value may be calculated by detecting absorbance peak. The signal processor may be a part of the processor 120.

Figure 2:
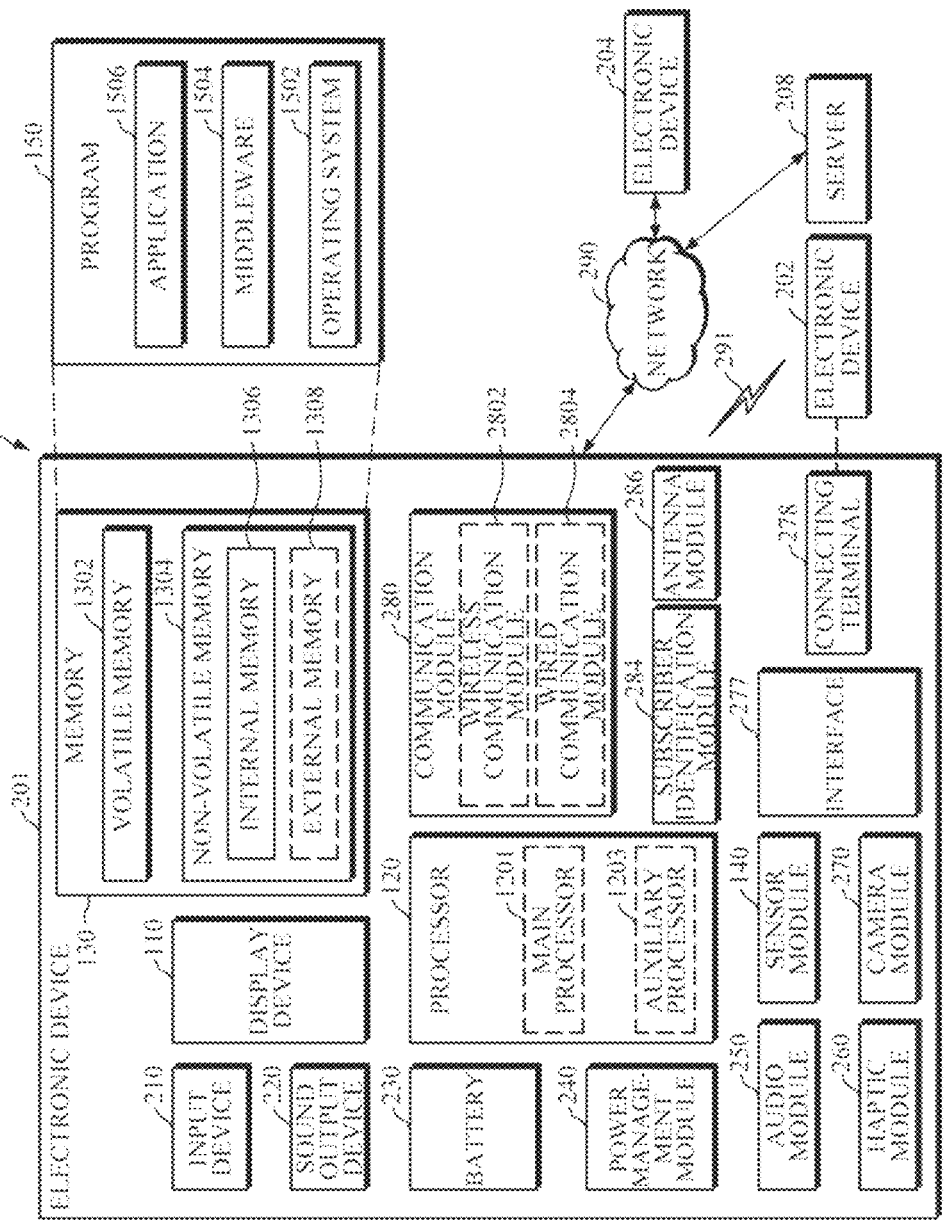
FIG. 2 is a block diagram illustrating an electronic device according to an embodiment, and a network environment to which the electronic device belongs.

FIG. 2 is a network environment to which an electronic device belongs.

Referring to FIG. 2, the electronic device 201 may include a display device 110, a processor 120, a memory 130, a sensor module 140, an input device 210, a sound output device 220, a battery 230, a power management module 240, an audio module 250, a haptic module 260, a camera module 270, an interface 277, a connecting terminal 278, a communication module 280, a subscriber identification module 284, and/or an antenna module 286. In some embodiments, at least one of the elements may be omitted from the electronic device 201, and one or more other elements may be added in the electronic device 201. Descriptions of the elements similar to those of the electronic device 100 shown in FIG. 5 will be omitted.

The display device 110 may visually display a variety of data processed in one or more processors 120. The display device 110 may include a display, a hologram device, or a projector, and a control circuit for controlling the device. The display device 110 may include touch circuitry set to sense touch and/or sensor circuitry (a pressure sensor, etc.) set to measure the intensity of force generated by the touch.

The processor 120 may control one or a plurality of other elements (hardware and/or software components, and the like) connected to the processor 120 by executing software (a program 150, etc.), and may perform data processing or operation. The processor 120 may load an instruction and/or data received from another element (the sensor module 140, the communication module 280, or the like) in a volatile memory 1302, process the instruction and/or data stored in the volatile memory 1302, and store resulting data in a non-volatile memory 1304. The processor 120 may generate a master clock for synchronization of operations of the elements, and may provide the master clock to other elements.

The processor 120 may include a main processor 1201 (e.g., a central processing unit (CPU), an application processor (AP), etc.), and an auxiliary processor 1203 (e.g., a graphics processing unit (GPU), an image signal processor (ISP), a sensor hub processor, a communication processor (CP), etc.) that is operable independently of, or in conjunction with, the main processor 1201. The auxiliary processor 1203 may be adapted to consume less power than the main processor 1201, or to be specific to a specified function. The auxiliary processor 1203 may control at least some functions or states related to at least one element (e.g., the display device 110, the sensor module 140, the communication module 280, etc.) among the elements of the electronic device 201 on behalf of the main processor 1201 while the main processor 1201 is in an inactive state (e.g., sleep state), or together with the main processor 1201 while the main processor is in an active state (e.g., application execution state). The auxiliary processor 1203 (e.g., an image signal processor, a communication processor, etc.) may be implemented as part of another element (e.g., the camera module 270, the communication module 280, etc.) functionally related to the auxiliary processor 1203. Some parts of the sensor module 140 may each be implemented as an independent processor, or may be implemented in a form integrated into the main processor 1201 or the auxiliary processor 1203.

The memory 130 may store a variety of data used by the elements (e.g., processor 120, sensor module 140, and the like) of the electronic device 201. The data may include, for example, software (e.g., a program 150 and the like), sets of instructions, and input data and/or output data for instructions related thereto. The memory 130 may include the volatile memory 1302 and/or the non-volatile memory 1304. The non-volatile memory 1304 may include an internal memory 1306 and/or an external memory 1308. The program 150 may be stored as software in the memory 130, and may include an operating system 1502, middleware 1504, and/or an application 1506.

The sensor module 140 may detect an operational state (light, power, temperature, or the like) of the electronic device 201, or an external environmental state (user state or the like), and generate an electrical signal and/or data value corresponding to the detected state. The sensor module 140 may include the various sensors described above.

The input device 210 may receive an instruction and/or data to be used in the element (e.g., processor 120 or the like) from an external source (e.g., a user or the like). The input device 210 may include a microphone, a mouse, a keyboard, and/or a digital pen (stylus pen or the like). The input device 210 may optionally include the user's finger.

The sound output device 220 may output sound signals to the outside of the electronic device 201. The sound output device 220 may include a speaker and/or a receiver. The speaker may be used for general purposes, such as multimedia playback or recording playback, and the receiver may be used to incoming calls. The receiver may be combined as part of the speaker or may be implemented as an independent separate device.

The battery 230 may supply power to the elements of the electronic device 201. The battery 230 may include a primary cell which is not rechargeable, a secondary cell which is rechargeable, and/or a fuel cell.

The power management module 240 may manage power supplied to the electronic device 201. The power management module 240 may be configured as part of a power management integrated circuit (PMIC).

The audio module 250 may convert sound into an electric signal or inversely convert an electric signal into sound. The audio module 250 may obtain sound through the input device 210, and may output sound through the sound output device 220 and/or a speaker and/or a headphone of another electronic device 202 directly or wirelessly connected to the electronic device 201.

The haptic module 260 may convert an electrical signal into a mechanical stimulus (e.g., a vibration or a movement) or electrical stimulus which may be recognized by a user via his tactile sensation or kinesthetic sensation. The haptic module 260 may include a motor, a piezoelectric element, and/or an electric stimulator.

The camera module 270 may capture still images and moving images. The camera module 270 may include a lens assembly including one or more lenses, image sensors, image signal processors, and/or flashes. The lens assembly included in the camera module 270 may collect light emitted from a subject to be imaged. Some part (image sensor) of the camera module 270 may be used as a detector of a biometric sensor.

The interface 277 may support one or more specified protocols used by the electronic device 201 to be directly or wirelessly connected to another electronic device 202. The interface 277 may include, for example, a high definition multimedia interface (HDMI), a universal serial bus (USB) interface, a secure digital (SD) card interface, and/or an audio interface.

The connecting terminal 278 may include a connector via which the electronic device 201 may be physically connected to another electronic device 202. The connecting terminal 278 may include, for example, a HDMI connector, a USB connector, a SD card connector, and/or an audio connector (e.g., headphone connector, etc.).

The communication module 280 may support establishment of a direct (e.g., wired) communication channel and/or a wireless communication channel between the electronic device 201 and other electronic devices (e.g., the electronic device 202, an electronic device 204, the server 208, etc.) within a network environment 200, and performing of communication via the established communication channel. The communication module 280 may include one or more communication processors that are operable independently of the processor 120 (e.g., an application processor, etc.) and support a direct communication and/or a wireless communication. The communication module 280 may include a wireless communication module 2802 (e.g., a cellular communication module, a short-range wireless communication module, or a global navigation satellite system (GNSS) communication module) and/or a wired communication module 2804 (e.g., a local area network (LAN) communication module, a power line communication (PLC) module, etc.). Among these communication modules, a corresponding communication module may communicate with other electronic devices 202, 204, and 208 via a first network 291

(e.g., a short-range communication network, such as Bluetooth™, Wi-Fi direct, or infrared data association (IrDA)) or a second network 292 (e.g., a long-range communication network, such as a cellular network, the Internet, or a computer network (e.g., LAN, wide area network (WAN), etc.)). These various types of communication modules may be implemented as a single component (e.g., a single chip, etc.), or may be implemented as multi components (e.g., multi chips) separate from each other. The wireless communication module 2802 may identify and authenticate the electronic device 201 in a communication network, such as the first network 291 or the second network 292, using subscriber information (e.g., international mobile subscriber identity (IMSI), etc.) stored in the subscriber identification module 284.

The antenna module 286 may transmit or receive a signal and/or power to or from an external device (e.g., other electronic devices, etc.). The antenna module 286 may include an antenna including a radiating element formed of a conductive pattern formed on a substrate (e.g., PCB, etc.). The antenna module 286 may include one or a plurality of antennas. If the antenna module 286 includes a plurality of antennas, at least one antenna appropriate for a communication scheme used in the communication network, such as the first network 291 and/or the second network 292, may be selected from among the plurality of antennas by the communication module 280. Signals or power may be transmitted or received between the communication module 280 and other electronic devices via the selected antenna. In addition to the antenna, other components (e.g., a radio frequency integrated circuit (RFIC), etc.) may be further included as part of the antenna module 286.

At least some of the above-described elements may be mutually connected and may communicate signals (e.g., instructions, data, etc.) therebetween via an inter-peripheral communication scheme (e.g., bus, general purpose input and output (GPIO), serial peripheral interface (SPI), mobile industry processor interface (MIPI), etc.).

Instructions or data may be transmitted or received between the electronic device 201 and the external electronic device 204 via the server 208 connected to the second network 292. Other electronic devices 202 and 204 may be devices of a same type as, or a different type from, the electronic device 201. All or some of the operations to be executed at the electronic device 201 may be executed at one or more of other electronic devices 202, 204, and 208. For example, if the electronic device 201 is required to perform a function or a service automatically, the electronic device 201, rather than executing the function or the service, may request the one or more other electronic devices to perform at least part of the function or the service. The one or more other electronic devices that receives the request may perform at least part of the function or the service requested, or an additional function or an additional service related to the request, and may transmit a result of the performed function or service to the electronic device 201. To this end, a cloud computing, distributed computing, and/or client-server computing technology may be used.

Figure 3A:
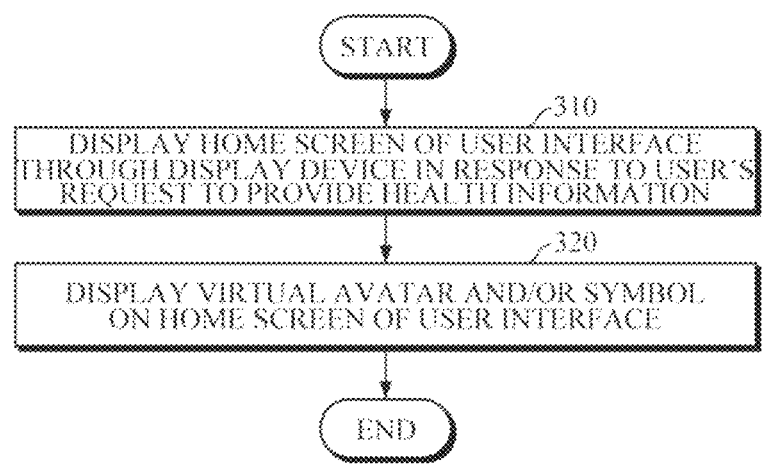
FIGS. 3A and 3B are flowcharts illustrating a method of providing health information using an electronic device according to one or more embodiments.
Figure 3B:
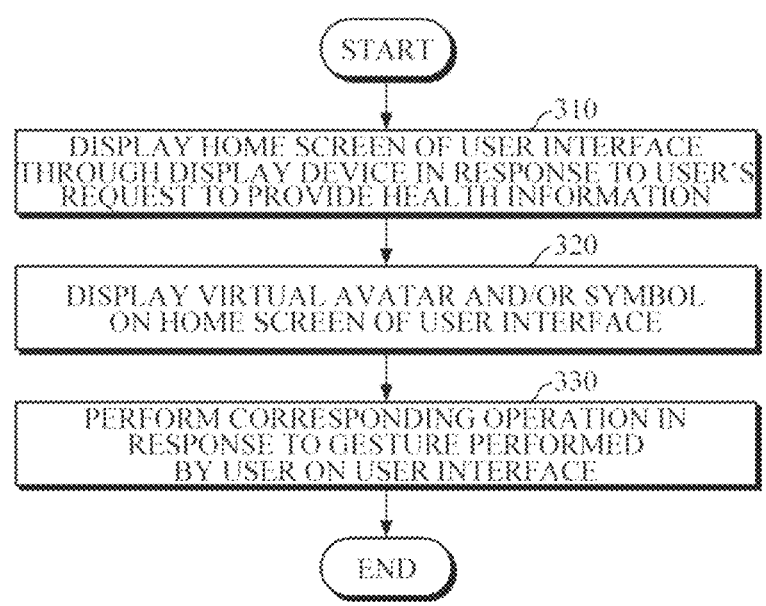

FIGS. 3A and 3B are flowcharts illustrating a method of providing health information using the electronic device 100 or 201 according to embodiments.

Referring to FIGS. 3A and 3B, the processor 120 may receive a user's request to provide health information and display a home screen of a user interface through the display device 110 in response to the request in operation 310. In operation 320, the processor 120 may display a virtual avatar (character) and/or symbols that respond to the user's health status or health management on the home screen. The home screen may be configured based on a default value of a health application or a value set by the user, and the type, arrangement structure, etc. of visual objects (e.g., a clock, a virtual avatar (character), a symbol, etc.) to be displayed may be determined. A gesture performed by the user on the user interface may be detected and a corresponding operation may be performed in response to the detection of the gesture in operation 330. The gesture may include, for example, a voice command, and clicking (including touch), double clicking, dragging (including touch-dragging, tab-dragging, etc.), scrolling, multi-touch gesture, and the like on the user interface, but is not limited to these examples.

Figure 4A:
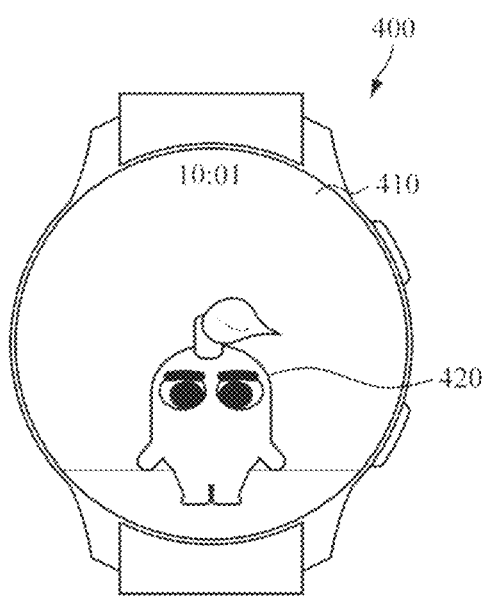
FIGS. 4A to 4P are diagrams illustrating examples of displaying a user interface on a display device of a smart watch-type electronic device 400, according to one or more embodiments.
Figure 4B:
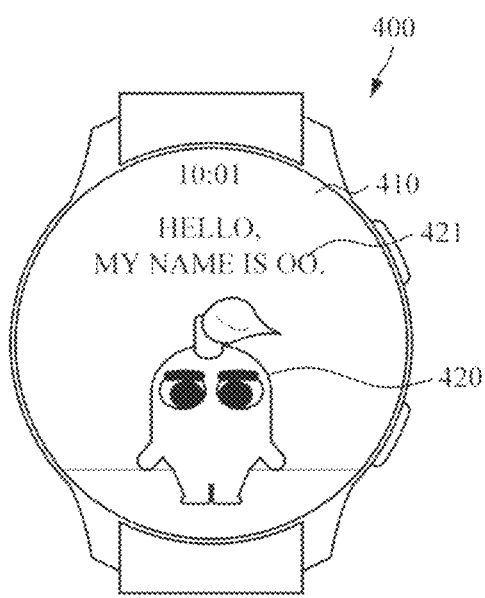
Figure 4C:
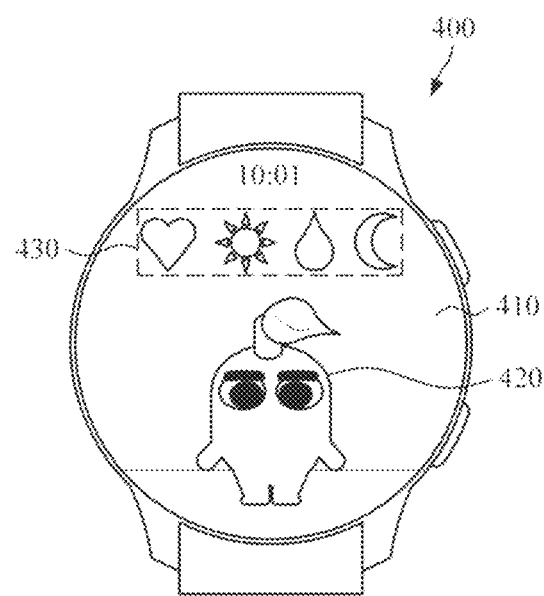
Figure 4D:
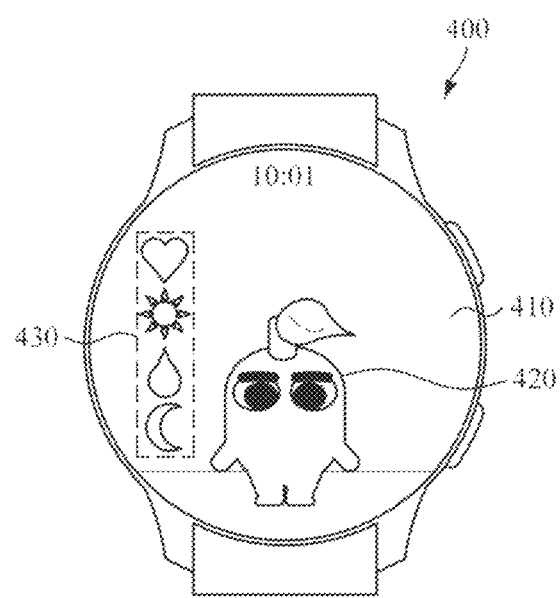
Figure 4E:
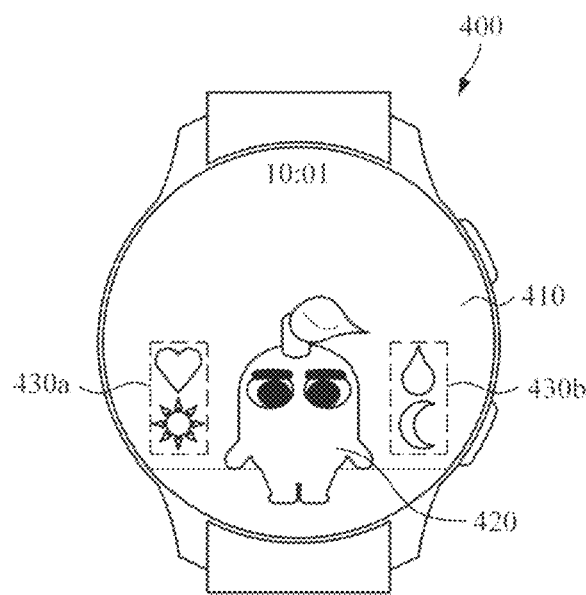
Figure 4F:
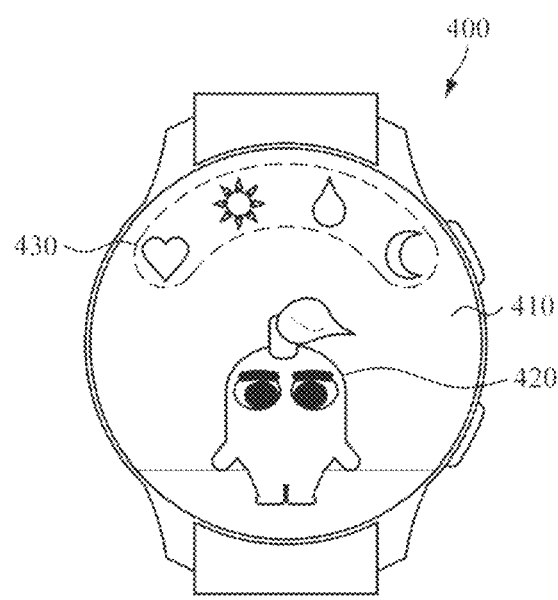
Figure 4G:
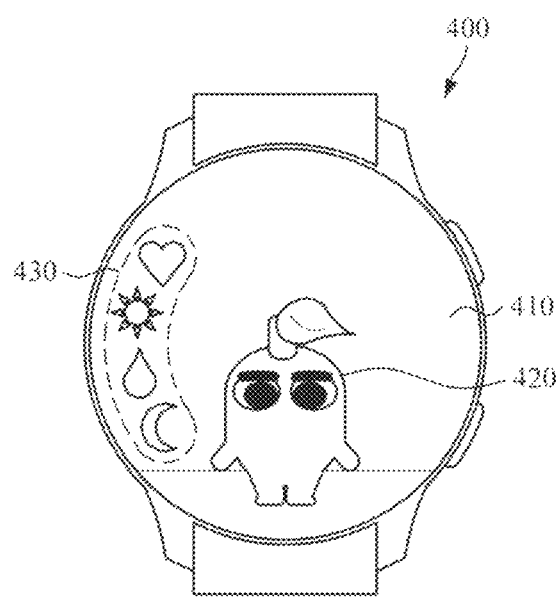
Figure 4H:
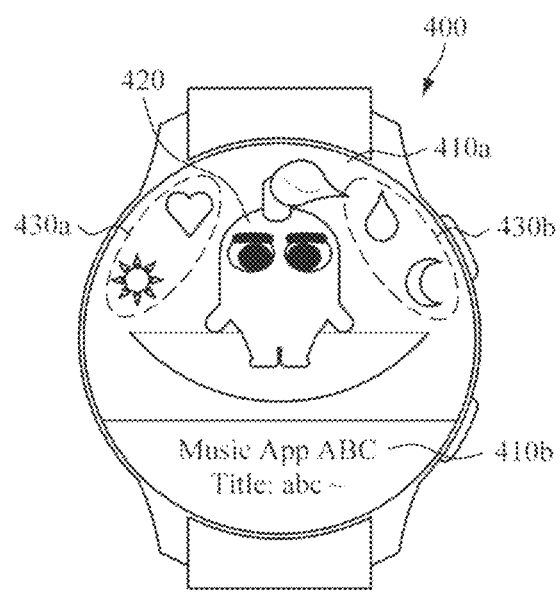
Figure 4I:
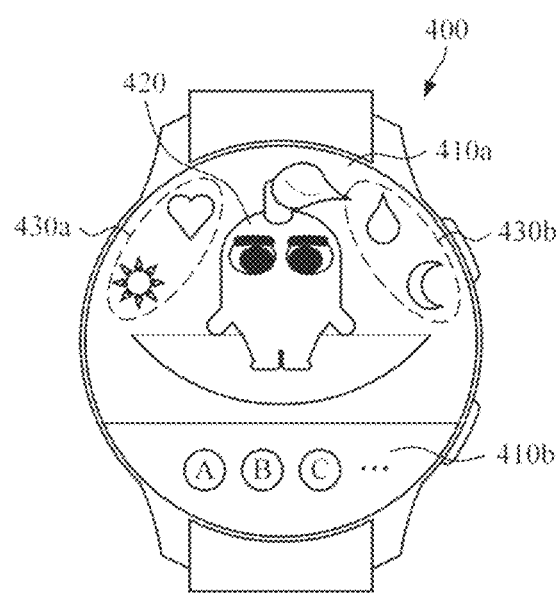
Figure 4J:
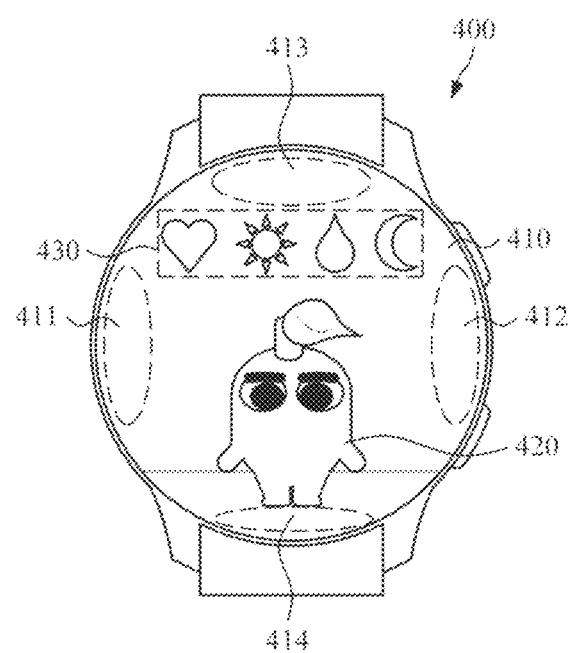
Figure 4K:
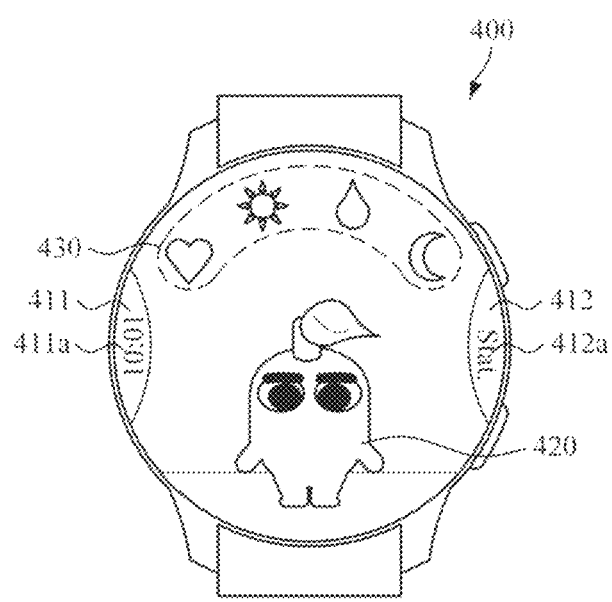
Figure 4L:
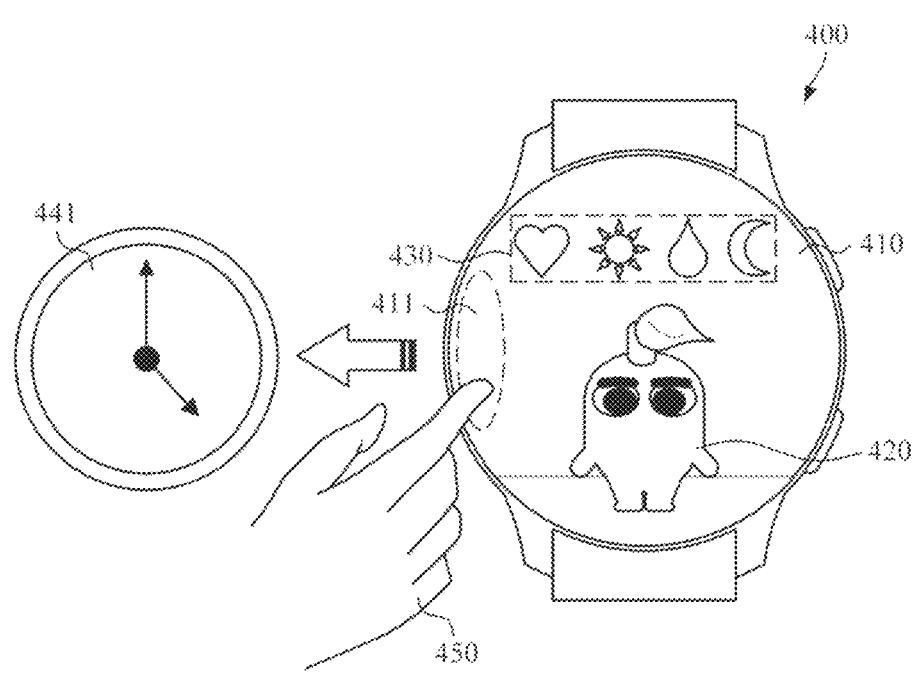
Figure 4M:
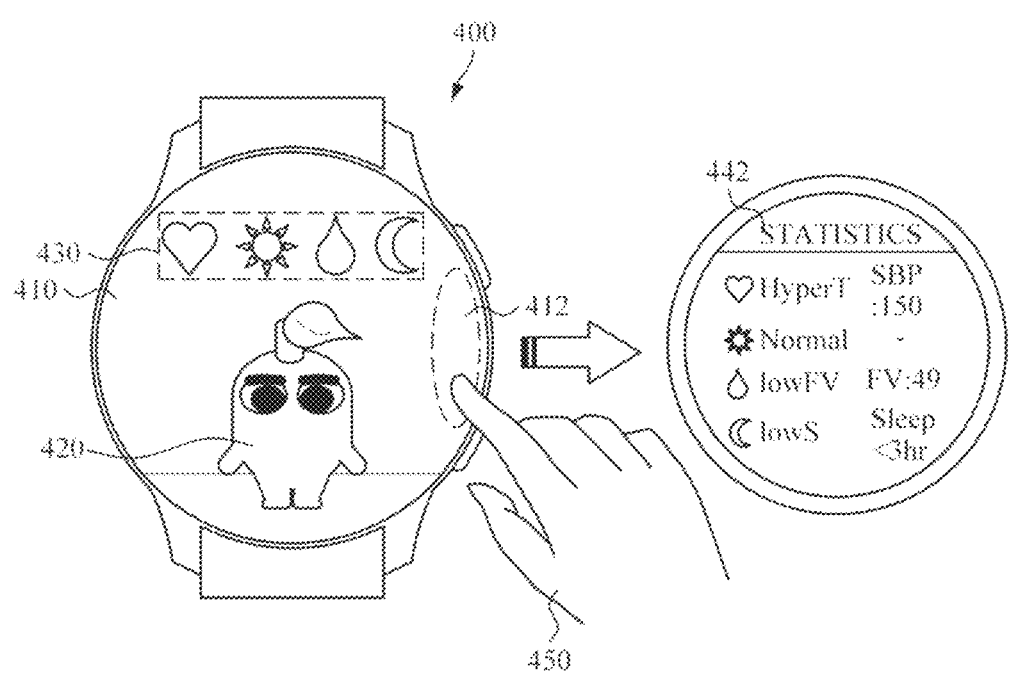
Figure 4N:
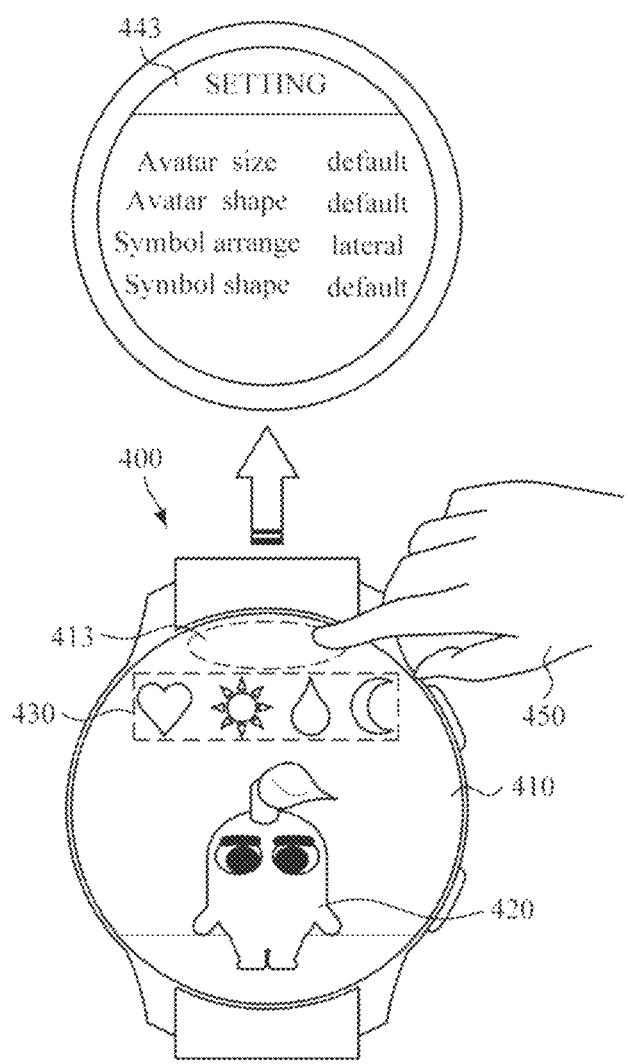
Figure 4O:
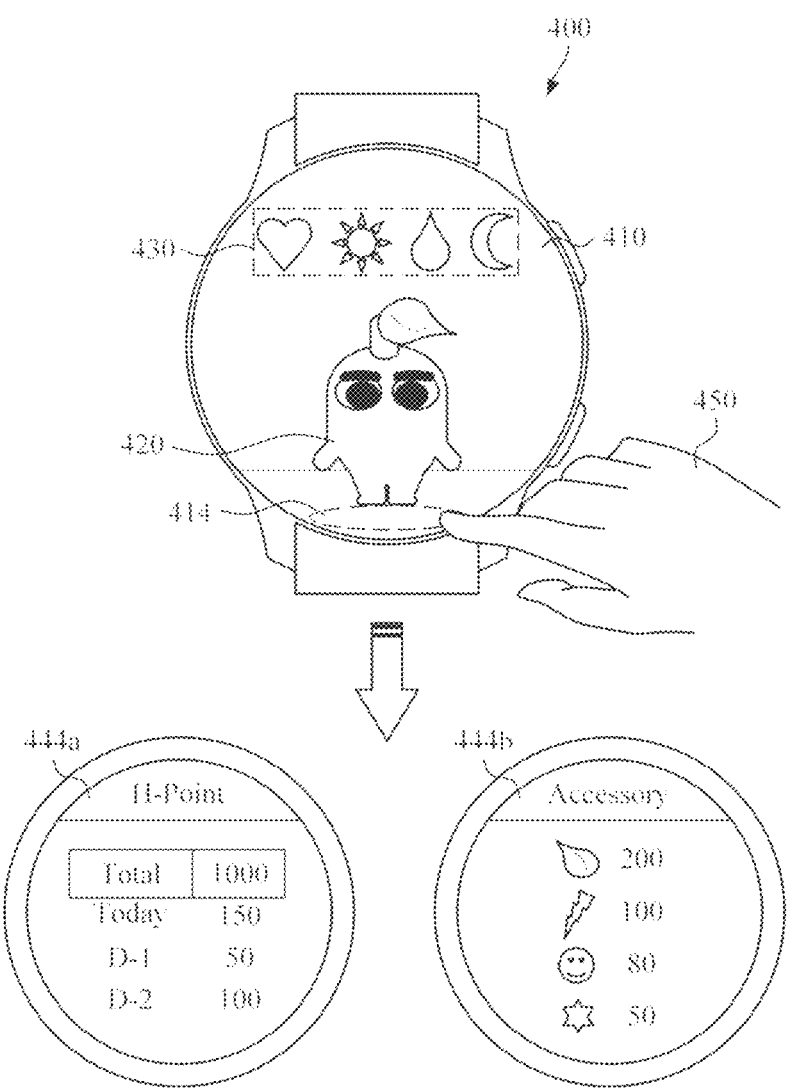
Figure 4P:
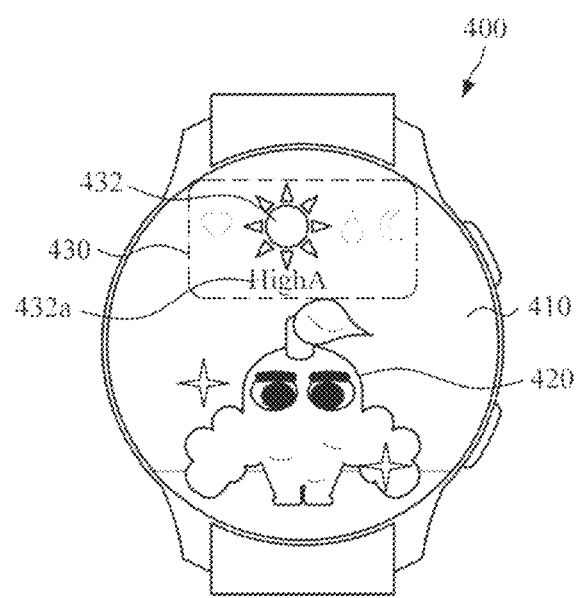

FIGS. 4A to 4P are diagrams illustrating examples of displaying a user interface 410 in a smart watch type electronic device 400.

As illustrated in FIGS. 4A and 4B, the user interface 410 may display a virtual avatar 420 that responds to the user's health status on a predetermined area of a home screen. The form, shape, and the like of the virtual avatar 420 are not limited to the illustrated example. Various virtual avatars 420 provided by default in a health application may be stored in the memory 130. A default avatar among the provided virtual avatars may be displayed, or the default avatar may be changed by the user's setting. The user may modify the various virtual avatars 420 provided by default, create a new avatar by using other images (e.g., the user's own image, an image of a celebrity, etc.) intact or modifying the images, or create the user's own unique character for use as a default avatar. For example, the virtual avatar 420 may be placed in a lower region of the user interface 410 of the home screen, and a placement position thereof may be adjusted in response to the user's setting or editing.

When the virtual avatar 420 is initially displayed on the user interface 410, the appearance of the virtual avatar 420 may be changed to show a welcome expression (smiley face) and a welcome action (waving hand, jump, or the like). As illustrated in FIG. 4B, text 421, such as "Hello, my name is OO," introducing the virtual avatar 420 may be displayed alone at a predetermined position (above, below, on the left or right side, or the like) of the user interface 410 or may be displayed simultaneously with the virtual avatar 420. Here, the name of the virtual avatar may be predefined to characterize the virtual avatar, and may be modified by the user. Alternatively, changes may be made to the facial expression of the virtual avatar 420 to make a sad expression, an angry expression, a happy expression, a sleepy expression, a lively expression, etc. reflecting the user's current psychological state and/or a previous health status assessment, the movement (e.g., jump, yawning with a hand, shrugging and shivering in the cold, etc.) of the virtual avatar 420 may be modified, a predetermined position (e.g., a head, hands/arms, etc.) of the virtual avatar 420 may be zoomed in/out, or the color (red, etc.) of the predetermined position may be modified. Text ("very sleepy," "very angry," "need rest," and "very cold") or the like related to the psychological state or health status may be displayed at a predetermined position of the user interface 410, simultaneously or non-simultaneously. At the same time, related information may be output as a voice signal, vibration, tactile sensation, and the like by using the sound output device 220, the haptic module 260, or the like. Alternatively, when the virtual avatar 420 is initially displayed, the default virtual avatar 420 may be displayed and may imitate or mimic actions performed by the user in synchronization with the actions of the user.

Referring to FIGS. 4C to 4G, symbols 430 may be displayed on the home screen of the user interface 410. The symbols 430 may be defined for each domain of a health item, and may be figures having different shapes. The domain or the health item may include cardiovascular index, vitality index, sleep-related index, nutrition/hydration index, and the like. A default symbol 430 set by default for each domain may be displayed. As illustrated, "heart" symbol for domain "cardiovascular index," "sun" symbol for "vitality index", "moon" symbol for "sleep-related index", and "water droplet" symbol for "nutrition/hydration related index" may be used. The user may change the default symbol among various symbols provided by default, and may purchase accessories from the decoration screen of the virtual avatar or symbols and use the accessories as a default symbol. The user may purchase the accessories using reward points provided according to the degree of achievement of the goal set by the user.

The symbols 430 may be arranged in a lateral line above (FIG. 4C) or below the virtual avatar 420, or may be arranged in a vertical line on the left (FIG. 4D) or right side of the virtual avatar 420. Alternatively, the symbols 430 may be separately disposed on the left side (430a in FIG. 4E) and right side (430a in FIG. 4E), or above and below the virtual avatar 420. Alternatively, the symbols 430 may be arranged above (FIG. 4F) or below the virtual avatar 420 in a curved line, or may be arranged on the left (FIG. 4G) or right side of the virtual avatar 420 in a curved line. The arrangement order of the symbols 430 may be changed.

Referring to FIGS. 4H and 4I, the virtual avatar 420 and/or the symbols 430a and 430b may be displayed on a first region 410a of the user interface 410. The symbols 430a and 430b may be separately arranged on both sides of the virtual avatar 420. In addition, a screen providing additional information (e.g., summary of previous health status, current psychological state message, health guide, etc.), a screen providing information on the application currently executed by the user (e.g., title/lyrics of the song being played, a received text message, etc.), linked application widgets (e.g., social media, text message, music, video, memo, photo, etc.), or the like may be displayed on a second region 410b. FIG. 4H is a diagram illustrating an example in which the title of the song being played is displayed on the second region 410b. FIG. 4I is a diagram illustrating an example in which various application widgets A, B, and C are displayed on the second region 410b. When the user touches widget A (e.g., social media widget), the current screen is switched to a screen of the selected application and the user may transmit information related to the health status to other users through the social media application. Alternatively, when the user touches widget B (e.g., music widget), a corresponding music application is executed, and when a song is played in the music application, the current screen may be switched to a screen as shown in FIG. 4H.

Referring to FIGS. 4J to 4P, the home screen of the user interface 410 may include one or more screen switching areas 411, 412, 413, and 414. The screen switching areas may be set only to some (e.g., left/right) of the top/bottom/left/right areas of the home screen. The screen switching areas 411, 412, 413, and 414 may not have any visual display as shown in FIG. 4J, and predetermined objects 411a and 412a may be displayed on some screen switching areas 411 and 412, as shown in FIG. 4K, so that the user can intuitively recognize the corresponding screens. The predetermined objects 411a and 412a may be, for example, application widgets, information (e.g., time 411a, temperature, humidity, body temperature, etc.) provided by the applications, or text 412a briefly describing the corresponding screen.

Other screens corresponding to the respective screen switching areas 411, 412, 413, and 414 may be set by default, and the user may change the screens in a health application setting screen. The screens may include, for example, screens of various applications (e.g., watch, device setting, social media, memo, photo, etc.) installed in the electronic device 100 or 201, the health application setting screen, a health application help screen, a detailed specification screen related to health status assessment, a statistical summary screen, a health guide screen, a reward point screen, a decoration screen of the virtual avatar and symbols, and the like. Referring to FIGS. 4L to 4O, when the user performs a gesture, such as clicking, double clicking, dragging to the left/right/top/bottom (screen swiping action) by touching the screen switching area 411, 412, 413, or 414 with a hand 450, the processor 120 may detect the gesture and switch the current screen to a watch screen 441, a statistics screen 442 related to the health status or health status assessment, a health application setting screen 443, or a reward point screen 444a or a decoration screen 444b of the virtual avatar or symbols.

FIG. 4P is a diagram illustrating an example in which the appearance of the virtual avatar 420 and/or the symbols 430 is modified based on the previous health status assessment of the user when the virtual avatar 420 and/or the symbols 430 are displayed on the home screen of the user interface 410. When the previous health status of the user indicates that the user is energetic and has high muscle mass due to sufficient exercise, the virtual avatar 420 may be modified to have thicker arms and bulging biceps as illustrated. In addition, a figure such as a star-shape, may be additionally displayed around the virtual avatar 420, and as for the symbols 430, a sun symbol 432 of domain "vitality index" may be activated, the color of the sun symbol 432 may be changed, and the size may be enlarged. Text 432a related to the health status assessment may be displayed on a symbol line around the symbol 432. The appearance of the virtual avatar 420 and/or the symbols 430 may be changed as described below according to the user's previous health status assessment.

Figure 5A:
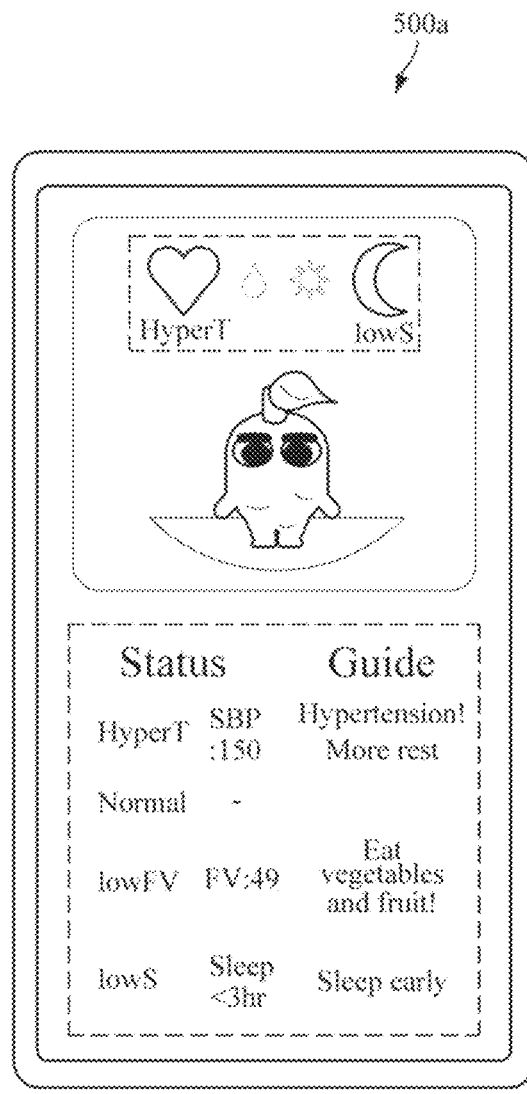
FIGS. 5A to 5D are diagrams illustrating examples of various electronic devices on which a user interface is displayed, according to one or more embodiments.
Figure 5B:
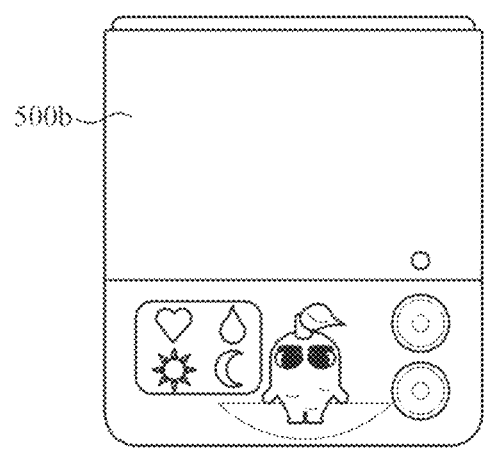
Figure 5C:
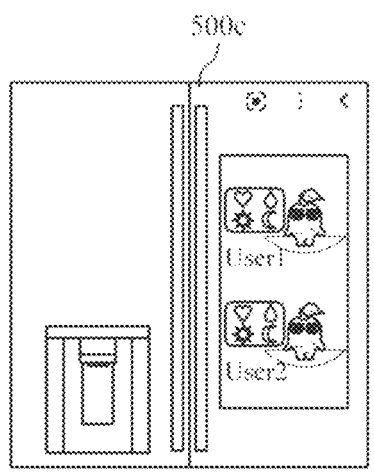
Figure 5D:
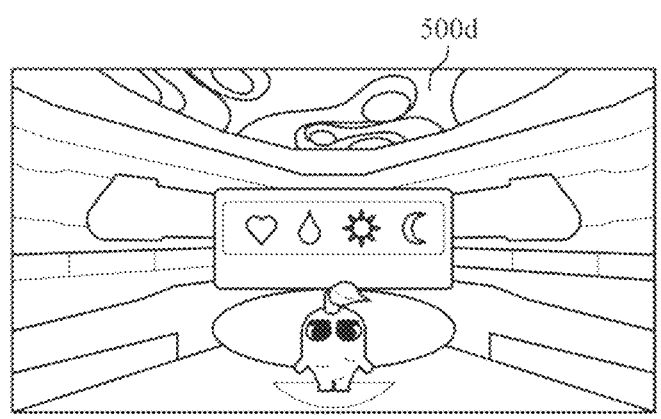

FIGS. 5A to 5D are diagrams illustrating examples of various electronic devices on which a user interface is displayed. Various embodiments of the above-described electronic devices 100, 201, and 400 or an electronic device 900 to be described below may be implemented as smartphone/tablet PC-type electronic devices 500a and 500b as illustrated in FIGS. 5A and 5B, and may be implemented as an Internet-of-Things (IoT) device 500c including a home appliance such as a refrigerator, a microwave oven, a washing machine, or the like, as illustrated in FIG. 5C. In addition, as illustrated in FIG. 5D, embodiments may be implemented in the form of metaverse or social media 500d so that comparison with virtual avatars of family and friends may be carried out and health management sharing and encouragement may be performed. However, embodiments are not limited to these examples and may be implemented in various electronic devices such as desktop PCs, notebook PCs, and the like.

Figure 6A:
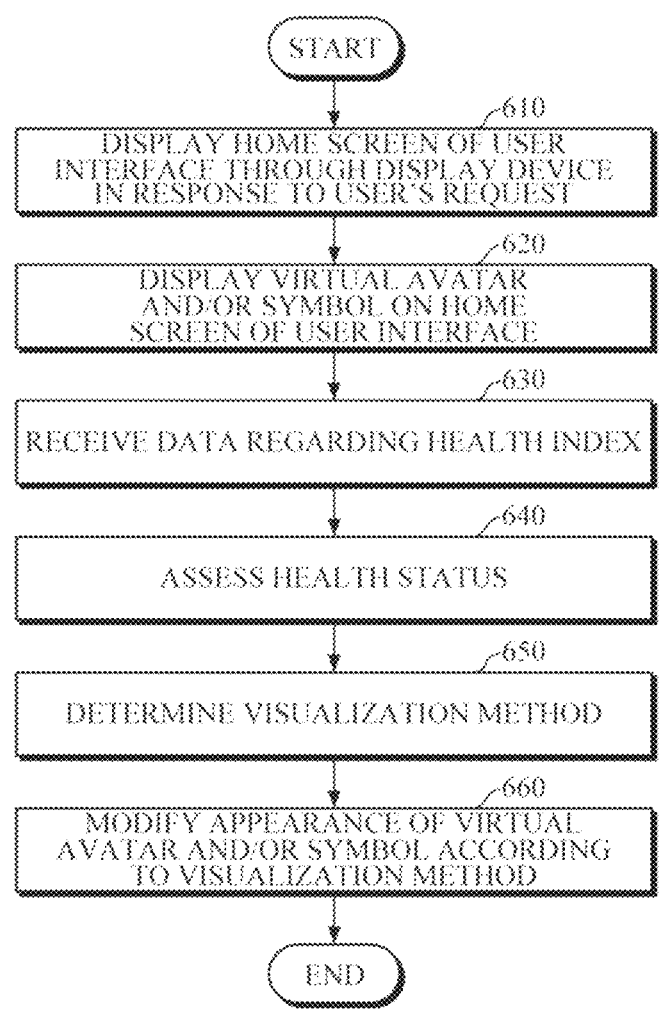
FIGS. 6A to 6D are flowcharts illustrating a method of providing health information using an electronic device, according to embodiments.
Figure 6B:
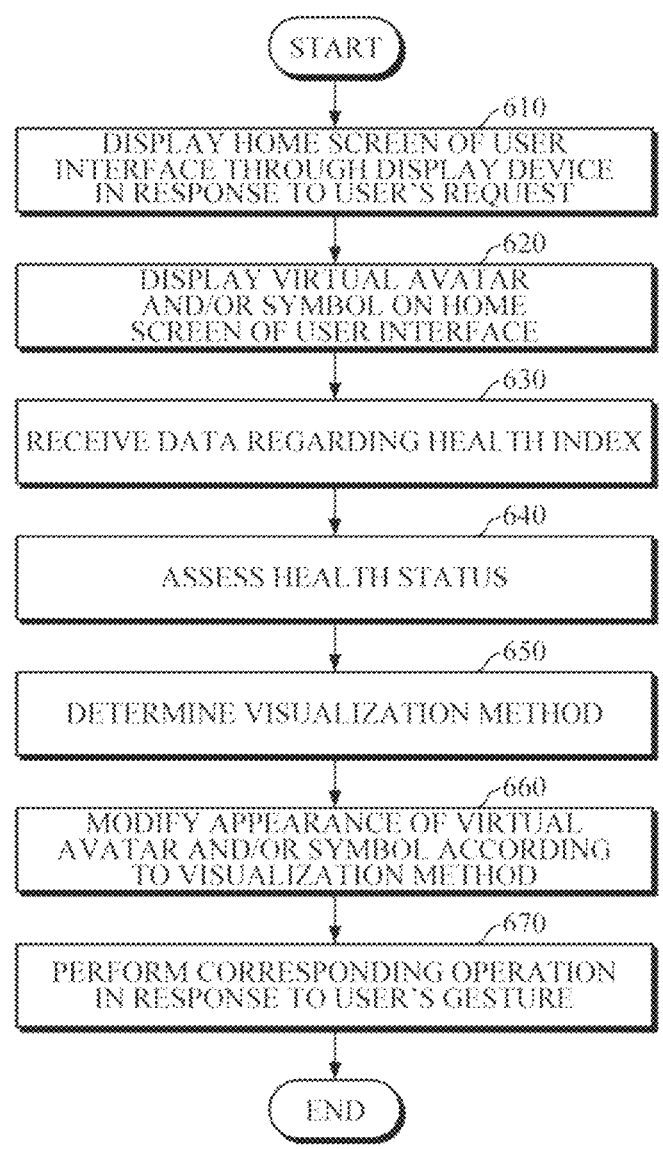
Figure 6C:
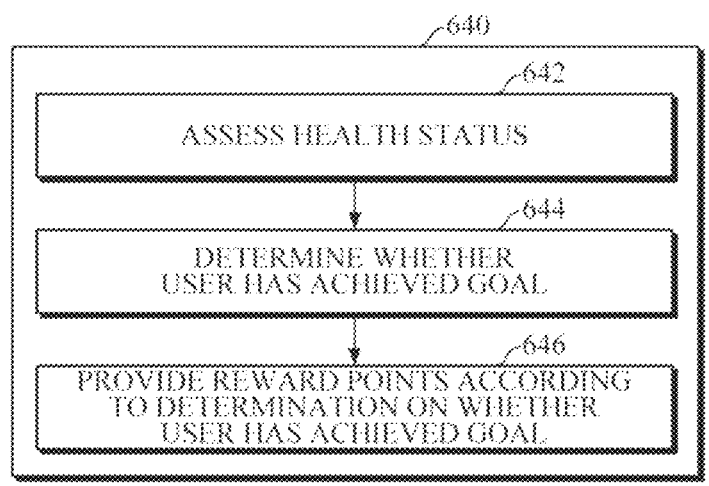
Figure 6D:
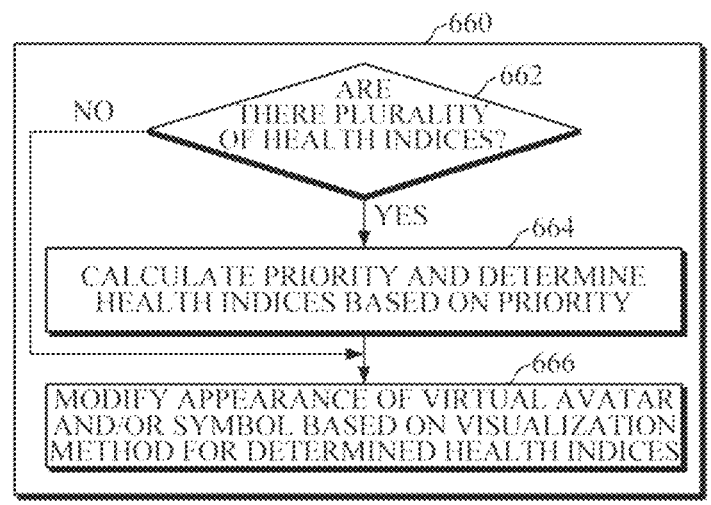
Figure 7:
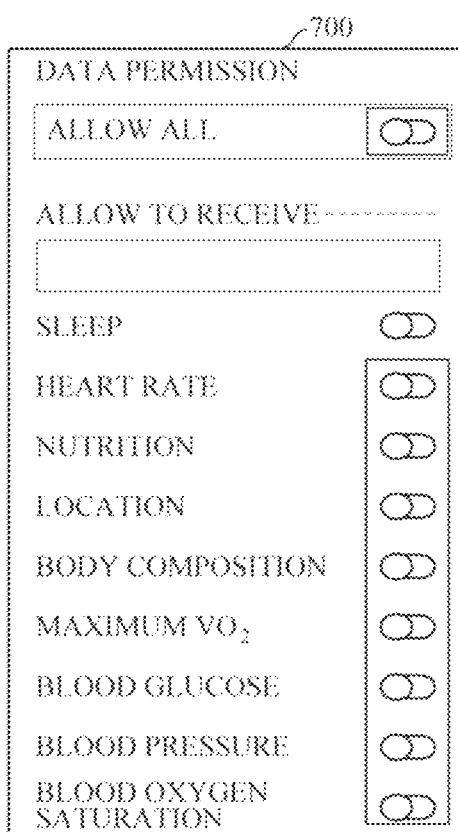
FIG. 7 is a diagram for illustrating acquisition of permission for health index data, according to an embodiment.

FIGS. 6A and 6D are flowcharts illustrating a method of providing health information using an electronic device according to embodiments. FIG. 7 is a diagram 700 for illustrating acquisition of permission for health index data. A method of providing health information to be described below may be performed by the electronic devices 100, 201, 400, 500a, 500b, 500c, and 500d described above and an electronic device 900 to be described below.

Referring to FIGS. 6A to 6D, the processor 120 may receive a user's request to provide health information, display a home screen of a user interface through the display device 110 in response to the request in operation 610, and display a virtual avatar (character) and/or symbols that responds to the user's health status on the home screen in operation 620. Operations 610 and 620 are described in detail above and hence detailed descriptions thereof will be omitted below.

The processor 120 may receive data regarding one or more health indices in operation 630. The processor 120 may collect data from the sensor module 140 in the electronic device, the applications and/or other electronic devices 202, 204, and 208, the input device 210, the camera module 270, and the like. The health indices may include user information, such as age, height, weight, sex, image, location, etc., skin condition, blood pressure, an antioxidant index, exercise amount, stress, sleep time, sleep stage, sleep quality, body water, body fat, blood oxygen saturation, PPG, BIA, ECG, EMG, IPG, pressure wave, VPG, blood glucose, and the like. Referring to FIG. 7, a screen for acquiring data authority related to health indices may be displayed and a health index to be collected may be determined according to the user's choice.

The user's health status may be comprehensively analyzed and assessed based on the collected data in operation 640. It may be determined whether the collected data is new data compared to the previous data, and if the collected data is not new data, the flowchart proceeds to operation 630, and if the collected data is new data, the health status may be assessed. Operation 640 of assessing the health status may include assessing or classifying the received data measurement value for each health index on the basis of assessment criteria or a classification database (DB) defined for the corresponding health index. In addition, operation 640 of assessing the health status may include determining a data type (e.g., quantitative, nominal, or ordinal) of the received data and classifying a domain to which the received data belongs.

Referring to FIG. 6C, operation 640 of assessing the user's health status may also include assessing the health status based on the collected data in operation 642, determining the degree of achievement of a goal set by the user on the basis of the health status assessment in operation 644, and providing reward points according to the degree of achievement of the goal in operation 646. The user may set a goal, such as exercise amount, exercise time, weight gain/loss, blood pressure reduction, vegetable/fruit intake, sleep time, etc., user priority for each item of the goal, a period by which to achieve the goal, and the like in a goal setting screen. The processor 120 may present a basic target value by taking into account physical conditions, such as age, sex, height, weight, etc., and may adjust the target value by taking into account the user's previous health status assessment. Alternatively, the processor 120 may present the average target value or the average degree of achievement of other users, especially users with similar physical conditions, such as age, sex, height, weight, etc., as the target value of the user. The processor 120 may determine the degree of achievement of the goal for each item based on the health status assessment and calculate and provide reward points. A weight may be assigned to the degree of achievement of the goal for each item according to the priority for each item set by the user and/or the level of difficulty (e.g., health risk degree) in achieving the goal. The user may use the provided reward points to purchase accessories for decorating the virtual avatar and/or the symbols on the decoration screen 444b (in FIG. 4O).

A visualization method of the virtual avatar and/or the symbols may be determined based on the health status assessment in operation 650. Determining the visualization method of the virtual avatar may mean determining a visual representation to be applied to the appearance of the virtual avatar according to the health status assessment in operation 640. The various visual representations of the virtual avatar may be predefined as various change indices (FIGS. 8C to 8F) for the shape or action of the virtual avatar. The virtual avatar may include one or more marks (e.g., face, torso, leaf, arms/legs, background, etc.), and the change indices may be defined by mapping various visualization channels (e.g., color, motion, size, number, additional figure (e.g., lightning, dark circles, text "zzz," waves, etc.), and the like) for each mark according to the health status assessment. One or more of the change indices may be determined according to the health status assessment. Determining the visualization method of the symbols may include determining the color, size, flashing speed, flashing frequency, gradually darkening or lightening color, or gradually increasing or reducing the size of the symbols corresponding to the domain classified in operation 640 of the health status assessment. The visualization method of the symbols may be preset to a default value for each domain and may be changed by the user.

The appearance of the virtual avatar and/or the symbols may be modified according to the determined visualization method in operation 660, and a corresponding operation may be performed in response to the user's gesture in operation 670. The gesture may include a voice command, and clicking (including touch), double clicking, dragging (including touch-dragging, tab-dragging, etc.), scrolling, multi-touch gesture, and the like, but is not limited to these examples.

Referring to FIG. 6D, operation 660 of modifying the appearance of the virtual avatar and/or the symbols may include, when there are a plurality of health indices that may require notification to the user (e.g., when blood pressure indicates hypertension and fat mass indicates obesity) in operation 662, calculating visualization priorities of a plurality of health indices and determining one or more health indices to be notified to the user based on the visualization priorities in operation 664.

The processor 120 may determine the visualization priorities for the health indices by taking into account the health risk degree, user's preference, and possibility of improvement for each health index. For example, a value obtained by the product of a value inversely proportional to the health risk degree, a value inversely proportional to the user's preference, and a value inversely proportional to the possibility of improvement may be determined as a priority. The health risk degree may be preset for each health item based on known medical information. The user may preset the rank of the user's preference for a plurality of health indices desired by the user for health management on the setting screen. The possibility of improvement may be preset based on known medical information and/or health status assessment.

For example, when the health risk degree may be defined as shown in Table 1, the possibility of improvement may be defined as Table 2, the user's preference may be defined as shown in Table 3, the user's blood pressure level is 160 mmHg or more, which indicates that the health status is hypertension and possible to be improved within 3 hours, and the antioxidant level is 50 or less, which indicates that the health status is lack of vegetables and possible to be improved within 1 hour, the visualization priority of blood pressure may be determined to be 0.25 (=health risk degree value×½ of user's preference value×½ of value of possibility of improvement), and the visualization priority of antioxidant may be determined to be 0.33 (=⅓ of health risk degree×½ of user's preference value×½ of value of possibility of improvement).

TABLE 1

| Rank of health risk degree | | Value |
|---|---|---|
| 1 | Cardiovascular system (blood pressure) | 1 |
| 2 | Vitality index | ½ |
| 3 | Nutrition/hydration (antioxidant) | ⅓ |
| 4 | Sleep index | ¼ |

TABLE 2

| Rank of possibility of improvement | | Value |
|---|---|---|
| 1 | Within 1 hour | 1 |
| 2 | Within 3 hours | ½ |
| 3 | Within 1 day | ⅓ |
| 4 | Week or more | ¼ |

TABLE 3

| Rank of user's preference | | Value |
|---|---|---|
| 1 | Nutrition/hydration (antioxidant) | 1 |
| 2 | Cardiovascular system (blood pressure) | ½ |
| 3 | Vitality index (muscle mass) | ⅓ |
| 4 | Sleep | ¼ |

The appearance of the virtual avatar and/or the symbols may be modified based on the visualization method for each health item determined based on the visualization priority in operation 666. The number of health items to be visualized may be one or plural according to the user's setting.

Figure 8A:
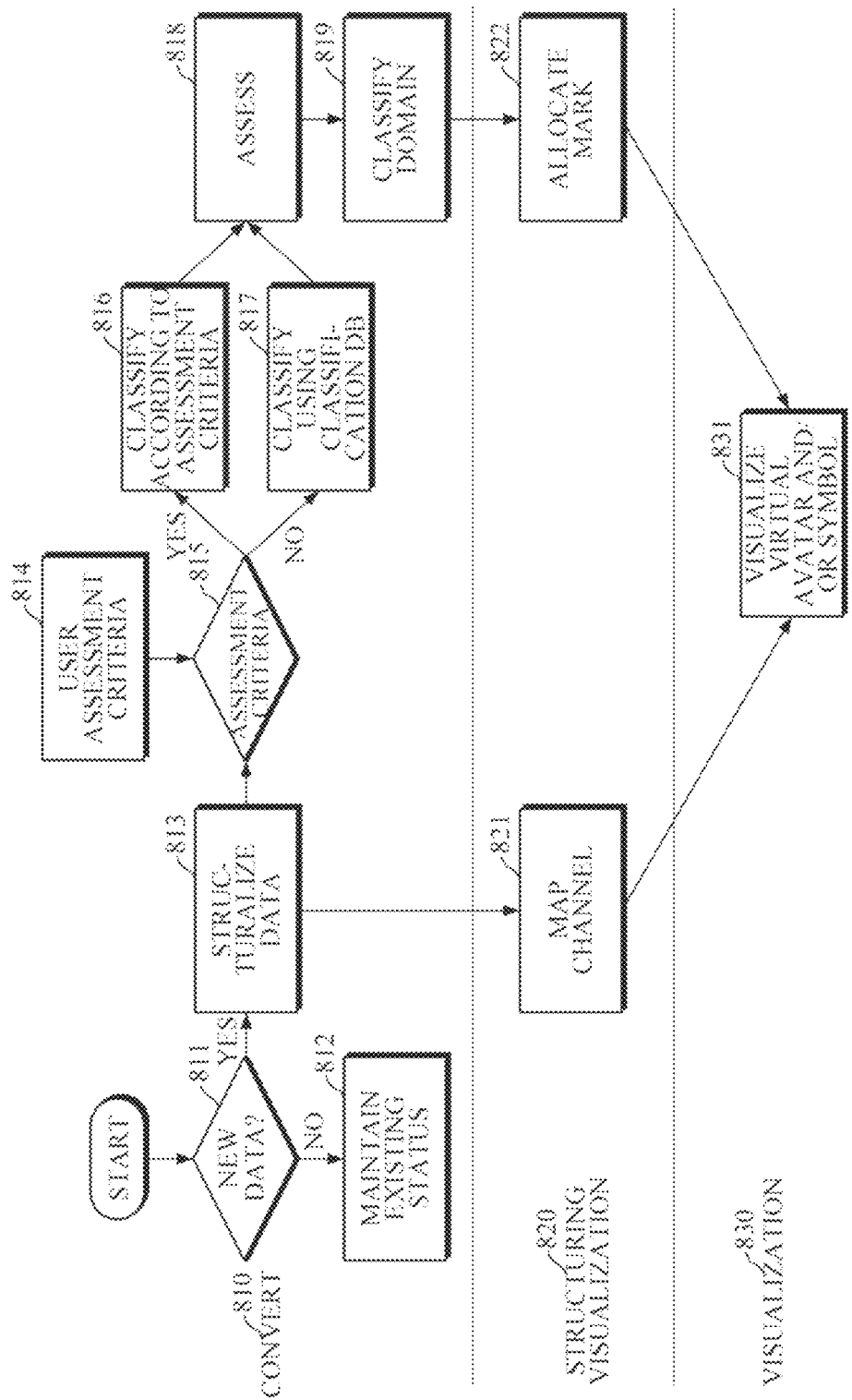
FIG. 8A is a flowchart illustrating a method of providing health information using an electronic device, according to an embodiment.

FIG. 8A is a flowchart illustrating a method of providing health information using an electronic device according to an embodiment. FIG. 8B shows an example of a data table generated through data conversion in an operation of assessing a health status. FIGS. 8C to 8F are tables which define various visualization methods of a virtual avatar and symbols. FIG. 8C illustrates change indices of domain "cardiovascular index," FIG. 8D illustrates change indices of domain "vitality index," FIG. 8E illustrates change indices of domain "sleep-related index," and FIG. 8F illustrates change indices of domain "nutrition/hydration-related index".

FIG. 8A may illustrates one embodiment of operations 640, 650, and 660 of FIGS. 6A to 6D. Operation 640 of assessing the health status may include converting the collected data in operation 810, operation 650 of determining the visualization method may include structuralizing the visualization based on the data conversion result of operation 810 in operation 820, and operation 660 of modifying the appearance of the virtual avatar or the symbols according to the visualization method may include visualization in operation 830.

Operation 810 of converting the collected data may include determining whether the collected data is new data in operation 811, maintaining the existing status in operation 812 if the collected data is not new data, and structuralizing the data by converting the data into the form of a first table DT1 in operation 813 if the collected data is new data. The first table DT1 may have fields of a data ID (Data ID), a first data type (1st Data Type), a measurement value (Value), and assessment criteria (Criteria). The assessment criteria may be criteria commonly used in the general medical field, and may be defined as personalized criteria through regression analysis for each user, or may be defined as a classification DB. The first data type may be defined based on a data measurement value and a health index. For example, age is "70" and thus may be classified as "Quantitative", and sex is "M or F" and therefore may be classified as "Nominal".

Operation 810 of converting the collected data may include determining whether there are user assessment criteria 814 exist in operation 815 with reference to the first table DT1, classifying a health status according to the assessment criteria in operation 816 when the assessment criteria exist, classifying the health status using a predefined classification DB in operation 817 when the assessment criteria do not exist, and comprehensively assessing the health status and generating a health guide in operation 818. For example, when a measured blood pressure level is above 100 mmHg of SBP or below 60 mmHg of DBP, it may be assessed as hypotension, and when a measured blood pressure level is above 140 mmHg of SBP or below 90 mmHg of DBP, it may be assessed as hypertension. An antioxidant level FVscore<50 may be assessed as lack of vegetable/fruit intake, 150<FVscore≤200 may be assessed as sufficient vegetable/fruit intake, and FVscore>200 may be assessed as excessive vegetable/fruit intake. A heart rate per minute of HR<50 may be assessed as slow heartbeat, HR>150 may be assessed as rapid heartbeat, and irregular HR may be considered as atrial fibrillation. In addition, if body water is less than 50% for a man and is less than 45% for a woman, it may be considered as dehydration, and if body water exceeds 65% for a man and exceeds 60% for a woman, it may be considered as excessive body water. Further, if the body fat is 25% or more, it may be considered as excessive body fat. If the user's age is over 70, it may be considered as "Elderly". Sleeping less than 5 hours is considered as sleep deprivation, and sleeping more than 12 hours is considered as excessive sleep. The health guide may include deep breathing suggestions, rest suggestions (e.g. "Hypertension! More rest"), dietary management (e.g. "How about a salad for lunch today?" etc.), exercise management (e.g. "You're not exercising enough"), sleep management (e.g., "Sleep early").

Operation 810 of converting the collected data may include classifying a second data type and a domain based on the health status assessment of operation 818 and structuralizing the data in the form of a second table DT2 in operation 819. The second table DT2 may have fields of assessment (Diagnosis), a second data type (2nd Data Type), and a domain (Domain). For example, as for the second data type, the user's age which is over 70 years and assessed as "Elderly," and blood pressure which is assessed as "hypertension" (SBP>160 mmHg) may be classified as "Ordinal," the user's sex, which is female, may be classified as "Nominal," and a value of muscle mass, which is 30% or more, may be classified as "Quantitative". In addition, when the health indices are blood pressure, heart rate, and electrocardiogram, relevant data may be classified as domain A (cardiovascular index), when the health index is exercise stress, relevant data is classified as domain B (vitality index), when the health indices are antioxidant, body water, body fat, and the like, relevant data may be classified as domain C (nutrition/hydration-related index), and when the health indices are sleep time, sleep stage, and sleep quality, relevant data may be classified as domain D (sleep-related index).

Operation 820 of structuralizing visualization may include mapping visualization channels, which are visualization elements to be applied to the marks of the virtual avatar, on the basis of the first and second data tables in operation 821 and allocating the marks to which the visualization channels are applied in operation 822. The visualization channels may be mapped using a known visualization encoding principle. The visualization method for the health index that may require notification to the user may be determined by combining one or more marks (e.g., face, torso, leaf, arms/legs, background, etc.) to modify the appearance of the virtual avatar based on the health status assessment and the visualization channels to be applied to each mark. The change index for the shape or action of the virtual avatar and a message to be added to a symbol line may be defined as illustrated in FIGS. 8C to 8F, and one or more symbol line messages and one or more change indices to be applied to the virtual avatar may be determined through operations 810 and 820. Embodiments illustrated in FIGS. 8C to 8F are merely exemplary, and thus the present disclosure is not limited thereto.

Operation 830 of visualization may include operation 831 of modifying the appearance of the virtual avatar and the appearance of the symbols according to the determined visualization method.

Figure 9A:
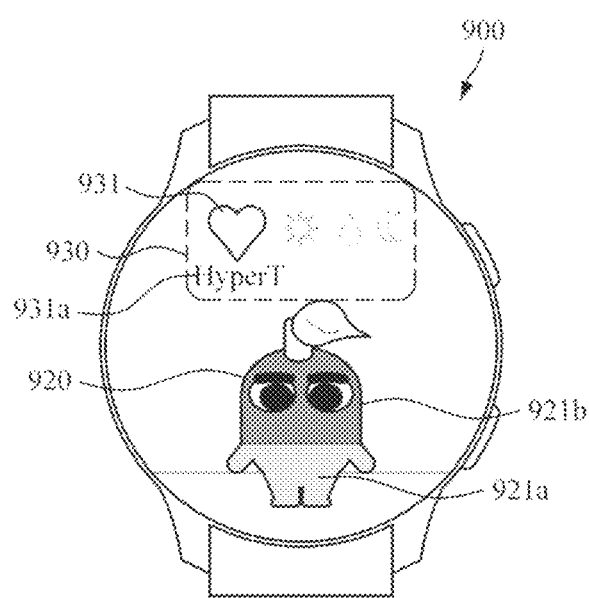
FIGS. 9A to 9R are diagrams illustrating examples of modification of the appearance of the virtual avatar and/or the symbols according to health status assessment, according to one or more embodiments.
Figure 9B:
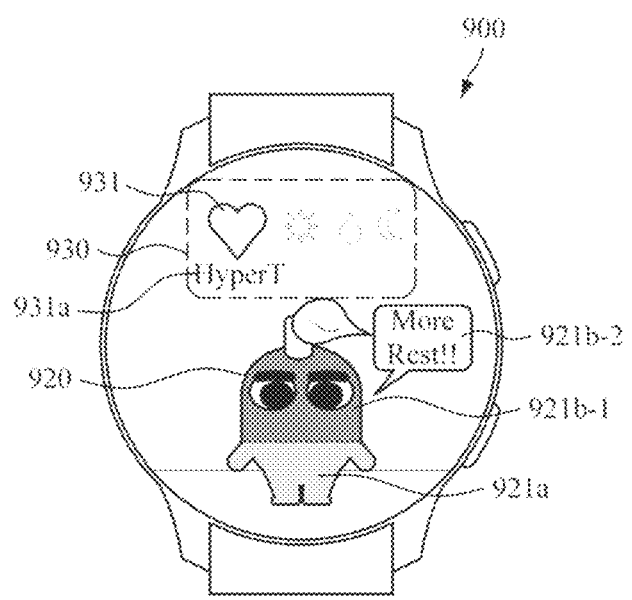
FIGS. 9S to 9W are diagrams illustrating examples of processing a user action in a user interface, according to one or more embodiments.
Figure 9C:
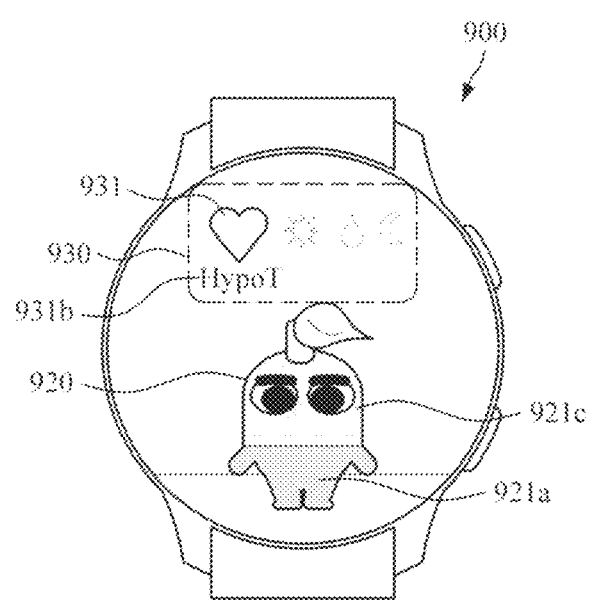
Figure 9D:
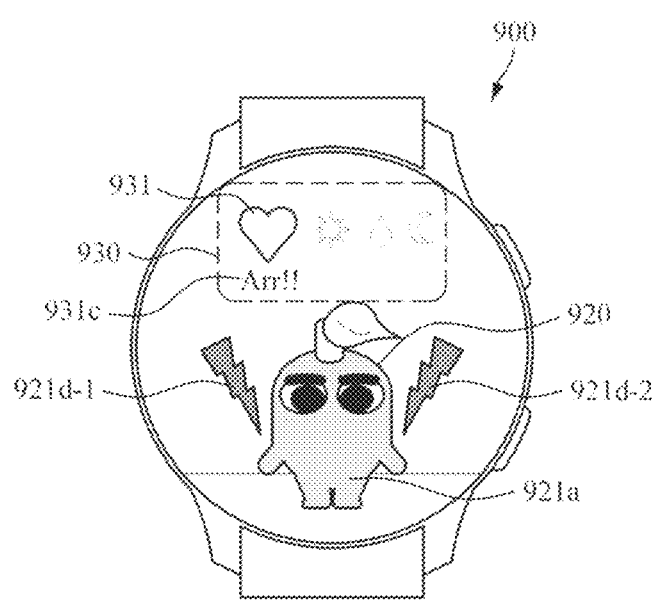
Figure 9E:
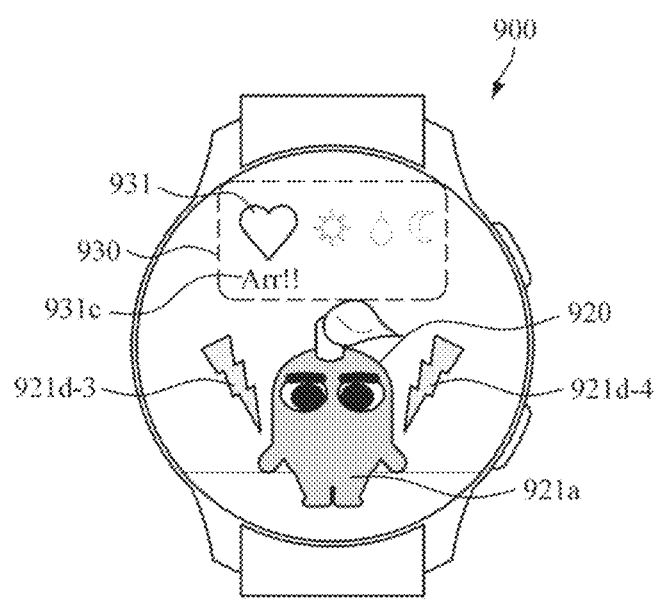
Figure 9F:
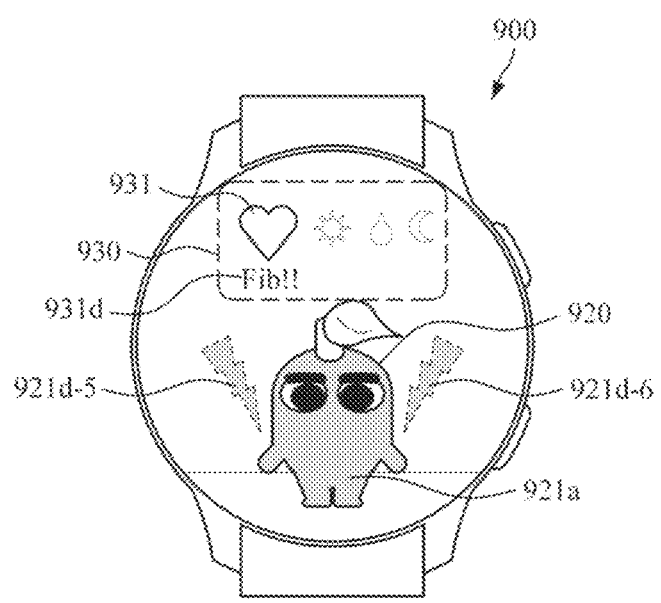
Figure 9G:
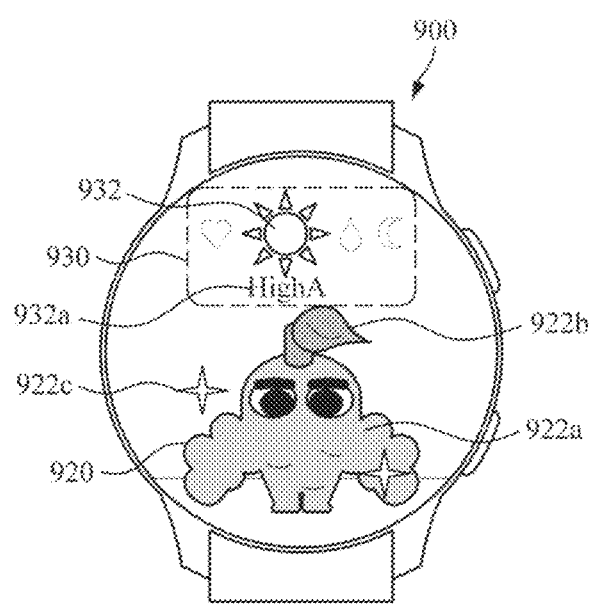
Figure 9H:
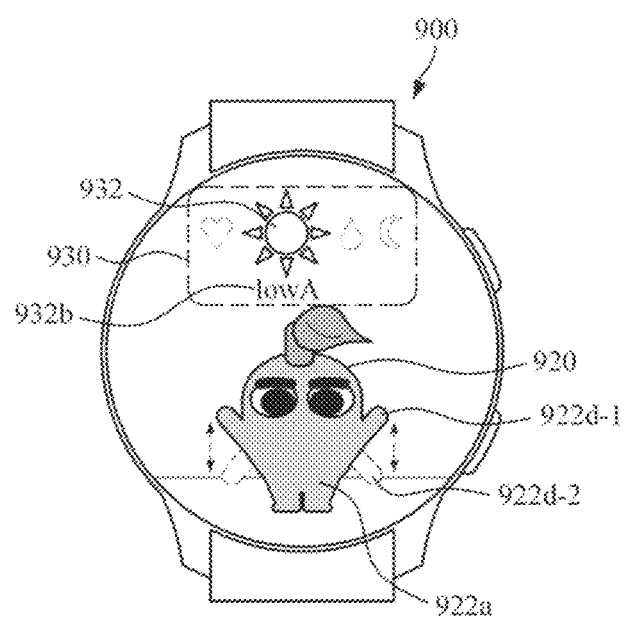
Figure 9I:
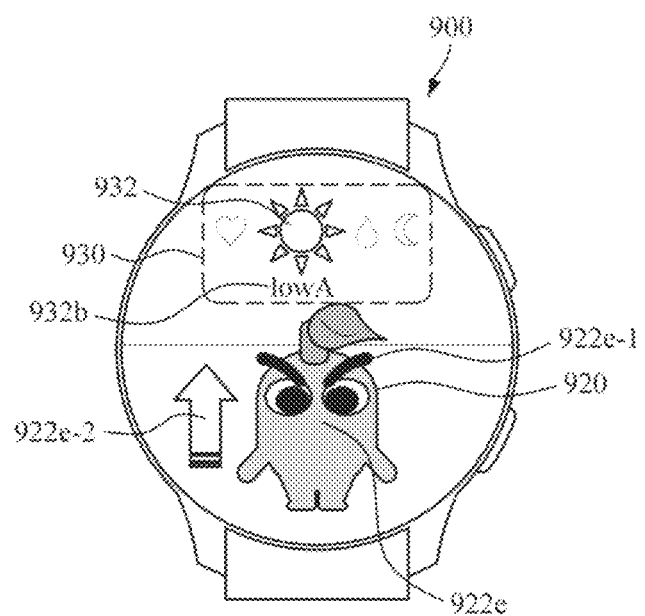
Figure 9J:
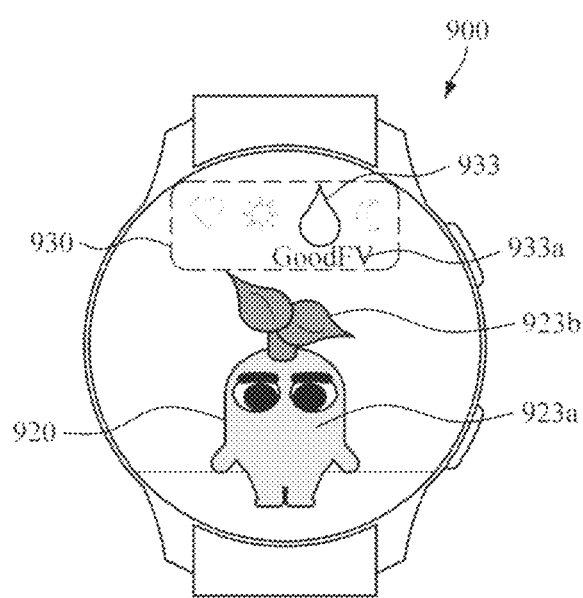
Figure 9K:
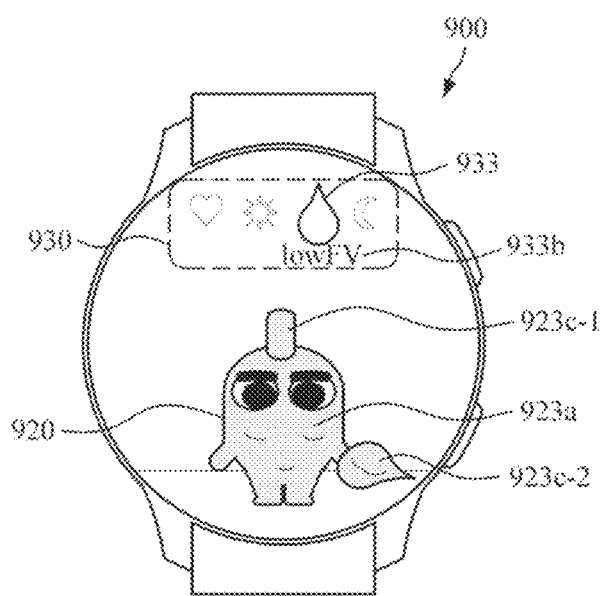
Figure 9L:
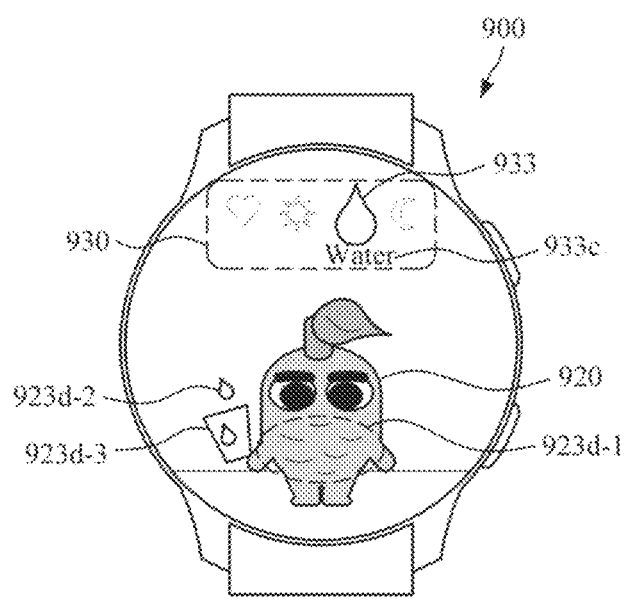
Figure 9M:
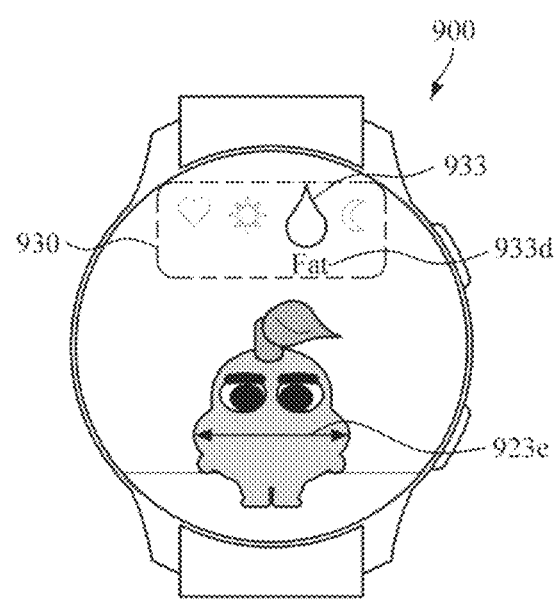
Figure 9N:
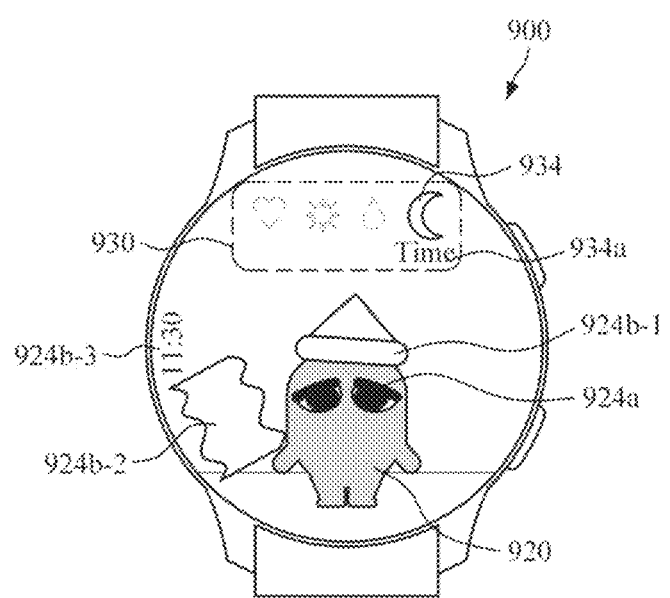
Figure 9O:
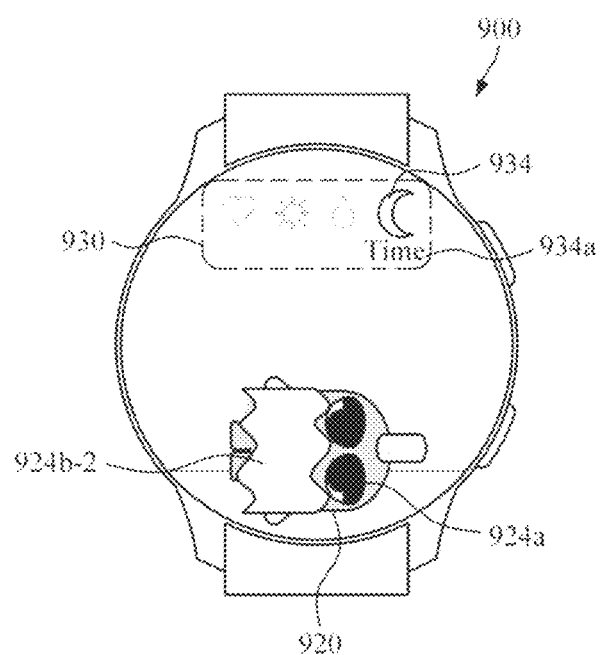
Figure 9P:
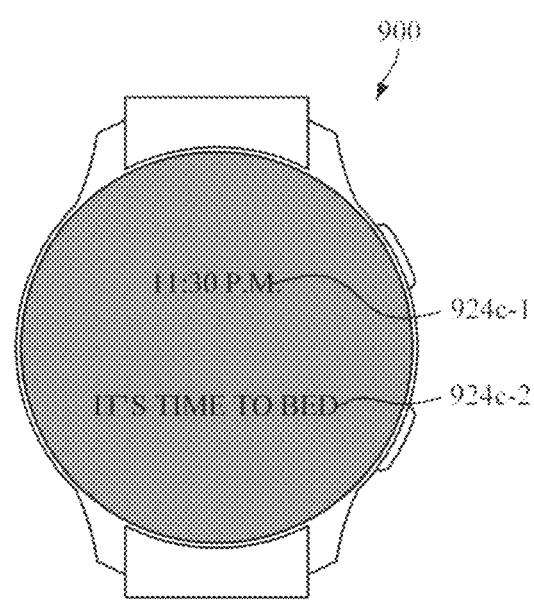
Figure 9Q:
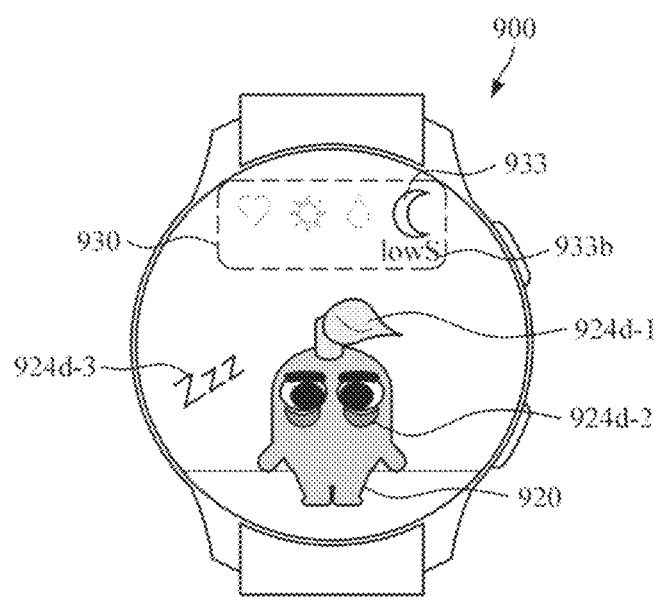
Figure 9R:
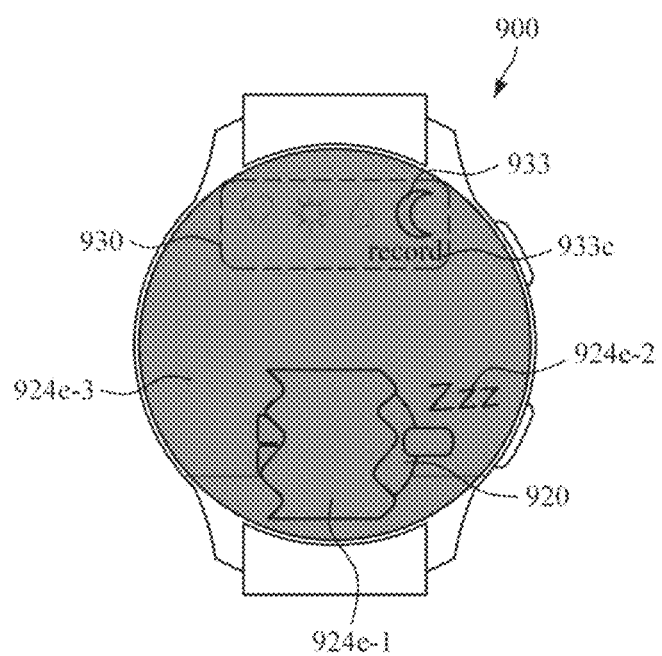

FIGS. 9A to 9R are diagrams illustrating examples of modifying the appearance of a virtual avatar and/or symbols in a smart watch 900 according to health status assessment. Specific examples of the type of mark, a visualization channel applied to the mark, and the like described herein are merely for illustrative purpose, and the type and the visualization channel are not limited to these examples and may vary without limitation.

FIGS. 9A to 9F are diagrams illustrating examples of visualization of "cardiovascular index".

Referring to FIGS. 9A to 9C, when the user's blood pressure is assessed as hypertension (FIGS. 9A and 9B), a face 921*b* and 921*b*-1 of a virtual avatar 920 may be modified to a first shape (red color), and simultaneously or separately the face 921*b* and 921*b*-1 may be modified to a first action (swelling). The rest part 921*a* may maintain its original shape. At the same time, a speech bubble 921*b*-2, such as "More rest," for providing a health guide for hypertension may be displayed automatically or in response to a user's gesture (e.g., clicking, double clicking, or, touching the virtual avatar, pressing the virtual avatar for a predetermined time after touch, pressing the virtual avatar at a predetermined pressure for a predetermined period after touch, or dragging in a predetermined direction while touching the virtual avatar). At the same time, related information may be output as a voice signal, vibration, tactile sensation, and the like by using the sound output device 220, the haptic module 260, or the like. When the user's blood pressure is assessed as hypotension (FIG. 9C), a face 921*c* of the virtual avatar 920 may be changed to a second shape (blue color) and the rest part 921*a* may maintain its original shape. Simultaneously or separately, the virtual avatar 920 may be changed to a second action (the avatar moves gradually slowly and changes to a sitting position).

At this time, as for symbols 930, a heart symbol 931 that corresponds to domain "cardiovascular index" may change its color to a first color (red) and/or be activated. In addition, the other symbols may be changed to a second color (bright color) and/or deactivated. Simultaneously or separately, the size of the heart symbol 931 may become relatively large compared to the other symbols, or the sizes of the other symbols may become relatively small compared to the heart symbol 931. Simultaneously or separately, the heart symbol 931 may flash periodically, or repeatedly change its color (light color→dark color). Simultaneously or in response to the user's gesture, a text message ("HyperT" 931*a* or "HypoT" 931*b*) associated with the health status assessment may be displayed on the symbol line. At the same time, the corresponding message may be output as a voice signal, vibration, tactile sensation, and the like by using the sound output device 220, the haptic module 260, and the like.

Referring to FIGS. 9D to 9F, when the user's heart rate HR per minute is, for example, more than 150 and thus assessed as very rapid (FIG. 9D), additional figures (lightning shapes 921*d*-1 and 921*d*-2), waves, a heart shape, etc.) may be displayed around the virtual avatar 920 or near the heart of the torso 921*a* and the additional figures may be changed to a third shape (in red color, wave movement gradually increasing in speed, heart shape flashing fast, etc.). Simultaneously or separately, the torso 921*a* of the virtual avatar 921 may be changed to a third action (running fast, shivering torso, etc.).

When the user's heart rate HR per minute is, for example, less than 50 and thus assessed as very slow (FIG. 9E), additional figures (lightning shapes 921*d*-3 and 921*d*-4, waves, a heart shape, etc.) may be displayed around the virtual avatar 920 or near the heart of the torso 921*a* and the additional figures may be changed to a fourth shape (blue color, gradually slowing wave movement, heart shape flashing slow, etc.). Simultaneously or separately, the torso 921*a* of the virtual avatar 921 may be changed to a fourth action (walking slowly, etc.).

When the user's heart rate HR per minute is irregular and thus assessed as atrial fibrillation (FIG. 9F), additional figures (lightning shapes 921*d*-5 and 921*d*-6, waves, a heart shape, etc.) may be displayed around the virtual avatar 920 or near the heart of the torso 921*a* and the additional figures may be changed to a fifth shape (yellow color, lightning shapes flashing continuously, irregular wave movement, heart shape flashing irregularly, etc.). Simultaneously or separately, the torso 921*a* of the virtual avatar 921 may be changed to a fifth action (irregular motion, etc.).

At this time, as for symbols 930, a heart symbol 931 that corresponds to domain "cardiovascular index" may change its color to a first color (red) and/or be activated, and the other symbols may be changed to a second color (light color) and/or deactivated. Simultaneously or separately, the size of the heart symbol 931 may become relatively large compared to the other symbols, or the sizes of the other symbols may become relatively small compared to the heart symbol 931. Also, the color of the heart symbol 931 may periodically flash, or repeatedly change its color (light color→dark color). Simultaneously automatically, or in response to the user's gesture, text messages (e.g., "Arr!!" 931*c* and "Fib!!" 931*d*) associated with the health status assessment may be displayed on the symbol line. At the same time, the corresponding message may be output as a voice signal, vibration, tactile sensation, and the like by using the sound output device 220, the haptic module 260, and the like.

FIGS. 9G to 9I are diagrams illustrating examples of domain "vitality index".

If sufficient muscle mass is due to exercise (the number of steps, walking/running speed, exercise time, etc.) or other activities (FIG. 9G), for example, when muscle mass is 100% or more, arms/legs of the virtual avatar 920 may be changed to a sixth shape (thicker biceps, more bulging biceps, change to lighter color, and an additional FIG. 922*c* displayed to make arms/legs glossy). Simultaneously or separately, the arms/legs 922*a* may be changed to a sixth action (action of bending an arm to show biceps, an action of jumping two or three times to show strength, etc.). Simultaneously or separately, a leaf 922b may increase in size, and the color thereof may be changed to a bright and dense color (green, etc.).

If there is a lack of exercise (FIG. 9H), for example, if exercise amount is less than or equal to the target amount set by the user or the average of other users, the arms/legs 922a of the virtual avatar 920 may be changed to a seventh shape (thinner arms/legs, a pale and dull color, etc.). Simultaneously or separately, the arms/legs 922a may be changed to a seventh action (an action of moving harms up and down 922d-1 and 922d-2 and walking action) to indicate that the user needs to exercise.

If there is a high stress index (FIG. 9I), a face 922e of the virtual avatar 920 may be changed to an eight shape (raised eyebrows 922e-1, frowning face, etc.), and optionally, the background may be changed to an eighth action (background moving up 922e-2).

As for the symbols 930, a sun symbol 932 that corresponds to domain "vitality index" may change its color to a third color (yellow/orange) and/or be activated, and the other symbols may be changed to a fourth color (light color) and/or deactivated. Simultaneously or separately, the size of the sun symbol 932 may become relatively large compared to the other symbols, or the sizes of the other symbols may become relatively small compared to the sun symbol 932. Also, the color of the sun symbol 932 may periodically flash, or repeatedly change its color (light color→dark color). Simultaneously or in response to the user's gesture, a text message (e.g., "HighA" 932a, "LowA" 932b, or "Stress" 932c) associated with the health status assessment may be displayed on the symbol line. At the same time, the corresponding message may be output as a voice signal, vibration, tactile sensation, and the like by using the sound output device 220, the haptic module 260, and the like.

FIGS. 9J to 9M are diagrams illustrating examples of domain "nutrition/hydration-related index".

When the health status assessment indicates sufficient vegetable/fruit intake (FIG. 9J), for example, when an antioxidant level FVscore is more than 150, a torso 923a of the virtual avatar 920 or a leaf 923b may be changed to a ninth shape (orange colored torso, dark green leaf, and increased number of leaves). The number of leaves 923b may be preset in proportion to the antioxidant level. For example, the number of leaves 923b may be set to 2 if the antioxidant level FVscore is 200 or more, and to 1 if the antioxidant level FVscore is 150 or more. In addition, the leaf 923b may be changed to a ninth action (an action of shaking the leak 923b to show off and the leaf 923b repeating to gradually grow from its original size).

When the health status assessment indicates lack of vegetable/fruit intake (FIG. 9K), for example, when an antioxidant level FVscore is less than 150, the torso 923a of the virtual avatar 920 or the leaf 923b may be changed to a tenth shape (white colored torso, light gray leaf, zero leaves 923c-1, and fallen leaves 923c-2). In addition, the leaf 923b may be changed to a tenth action (an action of shaking the leak 923b to show off or the leaf 923b repeating to gradually grow from its original size).

If there is a lack of hydration (FIG. 9L), for example, if body water is less than 50% for a man and less than 45% for a woman, the face of the virtual avatar 920 may be changed to an eleventh shape (brown colored face and increased wrinkles 923d-1). At this time, additional figures (water droplets 923d-2 and a water cup 923d-3) may be displayed and changed to a predetermined shape, such as the water droplets 923d-2 filling the water cup 923d-3, water droplets falling, water droplets flashing, etc.) to guide the user for rehydration. The face of the virtual avatar 920 or the background may be changed to an eleventh action (the background cracking), an action of opening a mouth and drinking water, etc.). Simultaneously or in response to a click on the virtual avatar 920, "lack of hydration" in a speech bubble may be displayed around the virtual avatar 920. If there is excessive hydration, for example, if body water is more than 65% for a man and more than 60% for a woman, the torso of the virtual avatar 920 may be changed to a twelfth shape (water dropping from the torso and pooling on the ground) and the virtual avatar 920 may be changed to a twelfth action (becoming limp).

If there is excessive fat (FIG. 9M), for example, if body fat is more than 25% or more than a user's target, the torso may be changed to a thirteenth shape (thicker waist 923e, which may vary depending on how much the fat mass exceeds a predetermined value), and may be changed to a thirteenth action (virtual avatar slowing down or sitting down).

As for the symbols 930, a water droplet symbol 933 that corresponds to "nutrition/hydration index" may change its color to a fourth color (green) and/or be activated, and the other symbols may be changed to a fifth color (light color) and/or deactivated. Simultaneously or separately, the size of the water droplet symbol 933 may become relatively large compared to the other symbols, or the sizes of the other symbols may become relatively small compared to the water droplet symbol 933. Also, the color of the water droplet symbol 933 may periodically flash, or repeatedly change its color (light color→dark color). Simultaneously or in response to the user's gesture, a text message (e.g., "GoodFV" 933a, "LowFV" 933b, "Water" 933c, or "Fat" 933d) associated with the health status assessment may be displayed on the symbol line. At the same time, the corresponding message may be output as a voice signal, vibration, tactile sensation, and the like by using the sound output device 220, the haptic module 260, and the like.

FIGS. 9N to 9R are diagrams illustrating examples of domain "sleep-related index".

When the sleep time set by the user is reached (FIGS. 9N, 9O, and 9P), the virtual avatar 920 may be changed to a fourteenth shape (sleepy facial expression and in pajamas). The virtual avatar 920 may be changed to a fourteenth action (lying down action, greeting with waving hand, changing into pajamas, or the like). At this time, additional figures (eyes 924a, a hat 924b-1, a blanket 924b-2, a Zzz symbol, and time display 924b-3) may be displayed and then switched to a dark background watch screen after a predetermined time to display time 924c-1 and/or a message 924c-2.

If there is a lack of sleep (FIG. 9Q), for example, if a sleep duration is less than or equal to a target duration (e.g., 5 hours) set by the user, or less than or equal to the generally known standard sleep duration or the average sleep duration of other users, the face of the virtual avatar 920 or a leaf may be changed to a fifteenth shape (dark circles 924d-1, leaf losing vitality 924d-1, and displaying of zzz 924d-3), and the face, the torso, and the leaf may be changed to a fifteenth action (slowing down, gradually lying down, drowsily lowering head, rubbing eyes, leaf drooping, etc.).

When the user is sleeping (FIG. 9R), the screen may be gradually changed to dark mode 924e-3 and completely turned off after a predetermined period of time. In the dark mode screen, an image 924e-1 of the virtual avatar 920 lying down and sleeping under a blanket may be displayed, and at this time, a Zzz symbol 924e-2 may be displayed. When sleep apnea is measured, text "record" may be displayed.

As for the symbols 930, a moon symbol 934 that corresponds to "sleep-related index" may change its color to a fifth color (blue) and/or be activated, and the other symbols may be changed to a sixth color (light color) and/or deactivated. Simultaneously or separately, the size of the moon symbol 934 may become relatively large compared to the other symbols, or the sizes of the other symbols may become relatively small compared to the moon symbol 934. Also, the color of the moon symbol 934 may periodically flash, or repeatedly change its color (light color→dark color). Simultaneously or in response to the user's gesture, a text message (e.g., "Time" 934a, "LowS" 934b, "record" 934c, or the like) associated with the health status assessment may be displayed on the symbol line. At the same time, the corresponding message may be output as a voice signal, vibration, tactile sensation, and the like by using the sound output device 220, the haptic module 260, and the like.

FIGS. 9S to 9W are diagrams illustrating examples of processing a user action in a user interface. Examples described herein are merely for illustrative purpose, and the embodiments are not limited to these examples and may vary without limitation.

Figure 9S:
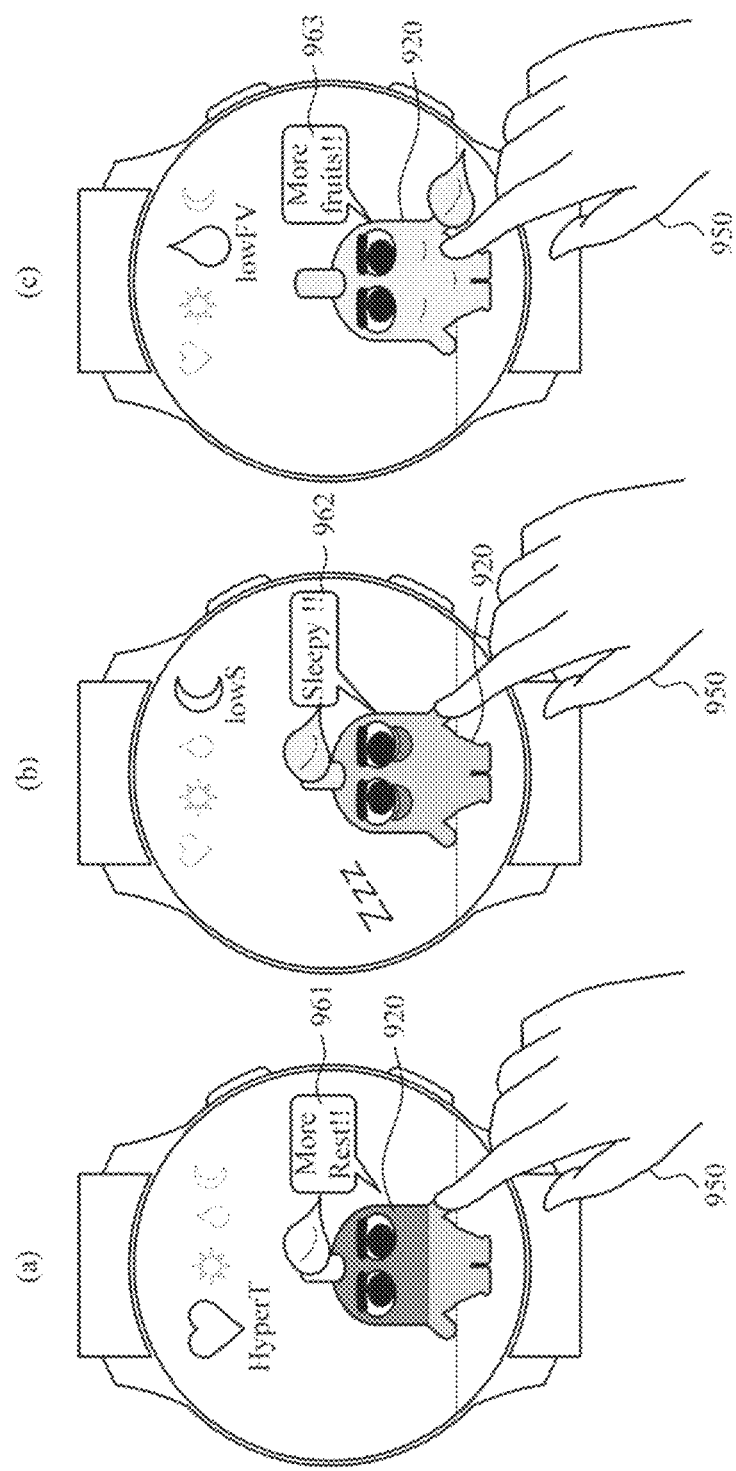
Figure 9T:
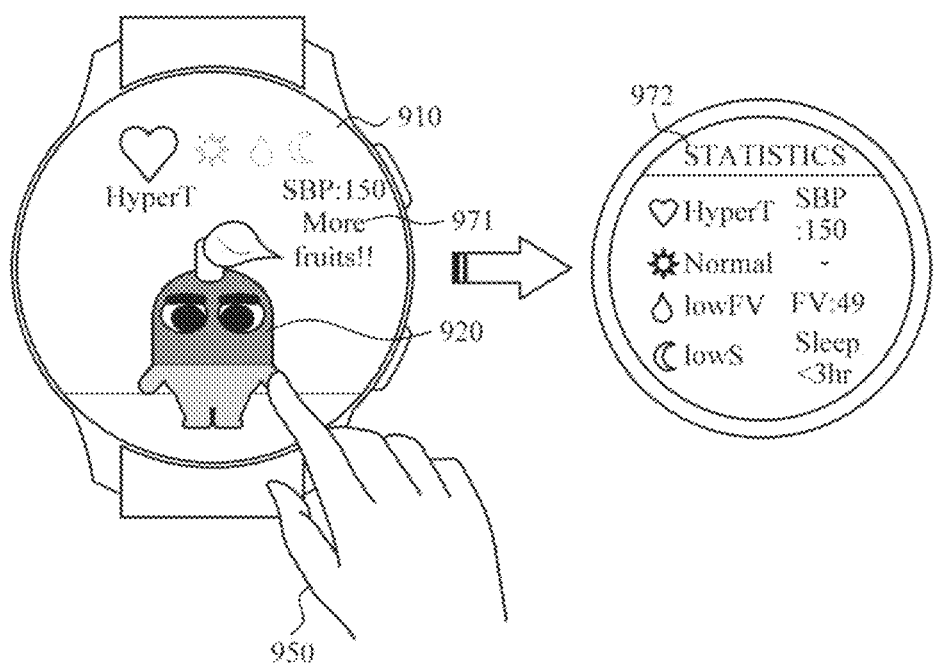

Referring to FIGS. 9S and 9T, in response to a gesture (e.g., voice command, touch clicking, double clicking, triple clicking, pressing while touching the virtual avatar for a predetermined period of time and/or with a predetermined pressure, moving in a predetermined direction while touching the virtual avatar, or the like) performed by the user on the virtual avatar 920 with an input device (e.g., a finger 950), the processor 120 may display health status assessment and/or a health guide message ("More Rest!!" 961 ((a) of FIG. 9S), "Sleepy" 962 ((b) of FIG. 9S), "More Fruits!!" 963 ((c) of FIG. 9S), or the like), or may display a text message 971, such as "SBP: 150 More Rest!!," that is superimposed on the current home screen 970. Alternatively, the processor 120 may control the virtual avatar 920 to perform a predetermined movement (shaking torso or the like). Alternatively, the processor 120 may perform switch to a separate detailed specification or a statistics screen 972. At the same time, the corresponding message may be output as a voice signal, vibration, tactile sensation, and the like by using the sound output device 220, the haptic module 260, and the like.

Figure 9U:
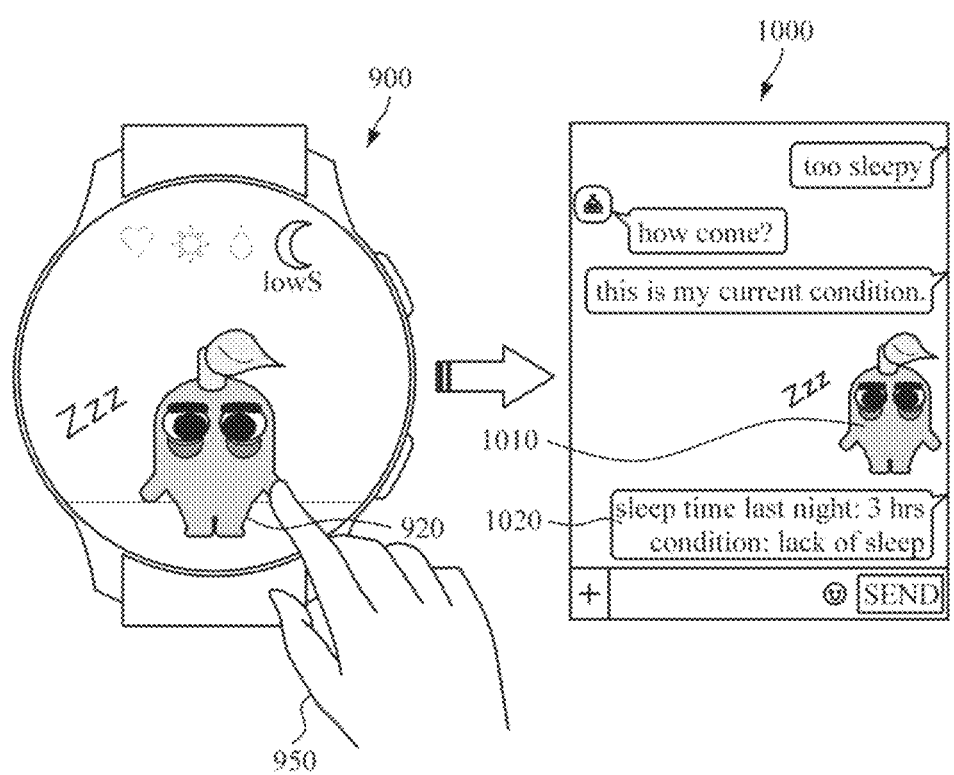
Figure 9V:
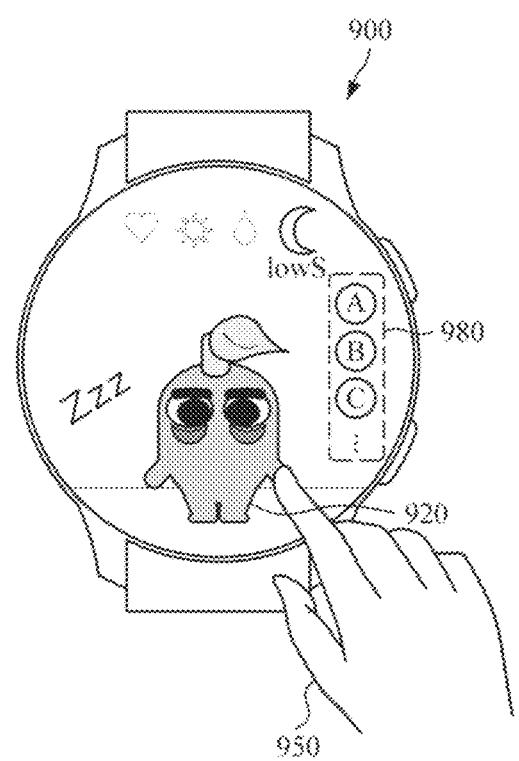

Referring to FIG. 9U, switch to a screen of a linked application (social media screen 1000) may be performed in response to a gesture performed by the user on the virtual avatar 920 with the input device (e.g., a finger 950). As illustrated in FIG. 9V, according to an embodiment, an application widget 980 may be displayed on a portion of the user interface in response to detection of the user's gesture, and upon selection of the widget by the user, the current screen may be switched to the selected application screen. Upon switch to the social media screen 1000, an appearance 1010 of the virtual character 920 and content 1020 related to health status and/or health guide may be automatically added as message content to be delivered. By doing so, the user may visually convey his/her health status to other users, such as friends, family, and the like. Alternatively, when the screen is switched to a music application screen, a list of music recommendations according to the user's health status may be displayed. When the user selects music to play, the title/lyrics of the song being played may be displayed on a portion of the user interface as shown in FIG. 4H.

Figure 9W:
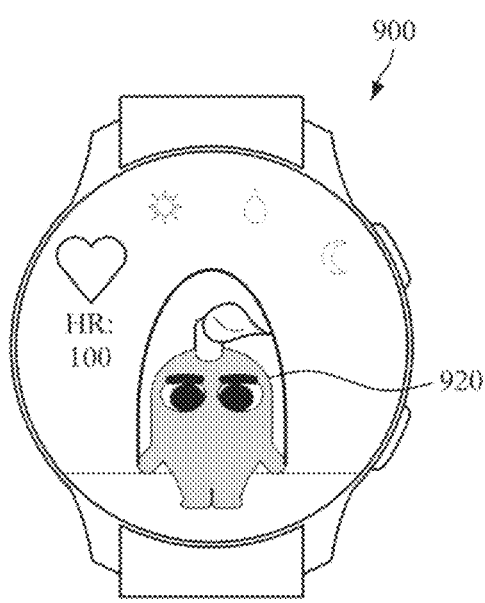

Referring to FIG. 9W, the processor 120 may detect the user's action through data collected by the camera module 270, the sensor module 140, and the like, and change the action of the virtual avatar 920 in response to the detected user action. For example, when the user jumps rope, the virtual avatar 920 may also jump rope. Simultaneously, the heart rate may be measured to activate a symbol related to the cardiovascular index, and the measured heart rate value may be displayed on the symbol line. In this way, by synchronizing the virtual avatar with the user's health status and action, it is possible to provide usefulness and fun factors to the user. At the same time, the corresponding message may be output as a voice signal, vibration, tactile sensation, and the like by using the sound output device 220, the haptic module 260, and the like.

Embodiments may be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing health information, using an electronic device with a display device and one or more processors, comprising:
   displaying, based on a request from a user, a home screen of a user interface through the display device;
   receiving data from at least one of a sensor included in the electronic device, an application installed on the electronic device, or another electronic device;
   assessing a health status of a user based on the received data, the health status being related to at least one health index of a plurality of health indices;
   displaying a virtual avatar that responds to the health status of the user on the home screen;
   determining a plurality of visualization priorities for the respective plurality of health indices based on at least one of health risk degree, user's preference, or possibility of improvement, wherein determining each visualization priority of the plurality of visualization priorities comprises:
      obtaining a value by a product of a value inversely proportional to the health risk degree, a value inversely proportional to the user's preference, and a value inversely proportional to the possibility of improvement;
   selecting at least one health index of the plurality of health indices based on the plurality of visualization priorities;
   determining a visualization method for the selected health index prompting notification to the user based on the assessed health status for the selected health index, wherein the determining the visualization method comprises determining one or more marks belonging to the virtual avatar and one or more channels for visualizing the one or more marks based on at least one of a data type or a domain of each item of the received data, and wherein the visualization method comprises at least one of changing a color of a first mark belonging to the virtual avatar, changing at least one of a size and shape of a second mark, changing at least one of a color and a number of third marks, or changing a size or movement of a fourth mark;

modifying an appearance of the virtual avatar based on the determined visualization method; and detecting a user's action through data collected by a camera or the sensor and changing, simultaneous with the modification of the appearance of the virtual avatar based on the determined visualization method, an action of the virtual avatar in response to the detected user action.

2. The method of claim 1, wherein the assessing of the health status comprises:

determining a degree of achievement of a goal set by the user based on the health status assessment; and providing reward points based on the degree of achievement of the goal.

3. The method of claim 1, wherein the assessing of the health status comprises:

assessing a health status for each item of the received data based on assessment criteria or a classification database (DB) defined for each health index of the plurality of health indices; and classifying the data type and the domain of each item of the received data based on the health status assessment.

4. The method of claim 3, further comprising:

displaying a symbol for each domain on the home screen; and modifying, based on a domain of the received data being classified, an appearance of a symbol of the classified domain.

5. The method of claim 4, wherein the domain comprises at least one of a cardiovascular index, a vitality index, a sleep-related index, or a nutrition/hydration-related index.

6. The method of claim 4, further comprising:

displaying information related to the health status assessment at a portion near the symbol whose appearance is modified, at a same time of modifying the appearance of the symbol.

7. The method of claim 4, further comprising:

identifying a gesture performed on the user interface and performing a corresponding operation based on the identified gesture.

8. The method of claim 7, wherein the performing of the corresponding operation comprises displaying at least one of health status assessment or health guide through a movement or speech bubble of the virtual avatar in response to a user's click on the virtual avatar.

9. The method of claim 7, wherein the performing of the corresponding operation comprises at least one of displaying a detailed specification related to the health status assessment on the home screen in a superimposed fashion or switching the home screen to a detailed specification screen in response to a user's click on the symbol.

10. The method of claim 7, wherein the performing of the corresponding operation comprises performing at least one of moving a position of the virtual avatar or the symbol, reducing the virtual avatar or the symbol in response to a user's action of dragging or doubling clicking the virtual avatar or the symbol, enlarging the virtual avatar or the symbol in response to a user's action of dragging or doubling clicking the virtual avatar or the symbol, and widening or narrowing a space between two fingers in contact with the virtual avatar or the symbol.

11. The method of claim 7, wherein the user interface comprises one or more screen switching areas, and the performing of the corresponding operation further comprises switching a current screen to a different screen based on the user performing at least one of clicking, double clicking, and dragging on the one or more screen switching areas.

12. The method of claim 11, wherein the different screen comprises at least one of an application screen, a setting screen, a help screen, a detailed specification screen associated with health status assessment, a statistical summary screen, a health guide screen, a reward point screen, or a decoration screen for the virtual avatar or the symbol.

13. The method of claim 11, wherein the screen switching areas comprise a visual object for recognizing a different screen that corresponds to each of the screen switching areas.

14. An electronic device comprising:

a display device;

one or more processors; and a memory storing one or more programs configured to be executed by the one or more processors to:

display, based on a request from a user, a home screen of a user interface through the display device;

receive data from at least one of a sensor included in the electronic device, an application installed on the electronic device, or another electronic device;

assess a health status of a user based on the received data, the health status being related to at least one health index of a plurality of health indices;

display a virtual avatar that responds to the health status of the user on the home screen;

determine a plurality of visualization priorities for the respective plurality of health indices based on at least one of health risk degree, user's preference, or possibility of improvement, wherein determine each visualization priority of the plurality of visualization priorities comprises:

obtain a value by a product of a value inversely proportional to the health risk degree, a value inversely proportional to the user's preference, and a value inversely proportional to the possibility of improvement;

select at least one health index of the plurality of health indices based on the plurality of visualization priorities;

determine a visualization method for the selected health index prompting notification to the user based on the assessed health status for the selected health index;

wherein the determine the visualization method comprises determine one or more marks belonging to the virtual avatar and one or more channels for visualizing the one or more marks based on at least one of a data type or a domain of each item of the received data, and wherein the visualization method comprises at least one of changing a color of a first mark belonging to the virtual avatar, changing at least one of a size and shape of a second mark, changing at least one of a color and a number of third marks, or changing a size or movement of a fourth mark;

modify an appearance of the virtual avatar based on the determined visualization method; and detect a user's action through data collected by a camera or the sensor and change, simultaneous with the modification of the appearance of the virtual avatar based on the determined visualization method, an action of the virtual avatar in response to the detected user action.

* * * * *